US006279288B1

(12) United States Patent
Keil

(10) Patent No.: US 6,279,288 B1
(45) Date of Patent: Aug. 28, 2001

(54) STRUCTURAL TUBING MEMBERS WITH FLARED OUT END SEGMENTS FOR CONJOINING

(76) Inventor: Kurt A. Keil, 717 Schuylkill Mountain Rd., Schuylkill Haven, PA (US) 17972

(*) Notice: Subject to any disclaimer, the term of this patent is extended or adjusted under 35 U.S.C. 154(b) by 0 days.

(21) Appl. No.: 09/277,868

(22) Filed: Mar. 29, 1999

Related U.S. Application Data

(60) Provisional application No. 60/081,869, filed on Apr. 16, 1998.

(51) Int. Cl.$^7$ ..................................................... E04B 1/343
(52) U.S. Cl. ........................... 52/653.2; 52/98; 52/656.1; 403/2; 403/3; 428/43
(58) Field of Search .......................... 52/98, 653.2, 655.1, 52/638, 656.9, 693; 403/2, 3; 428/36.9, 43, 35.2

(56) References Cited

U.S. PATENT DOCUMENTS

| | | | |
|---|---|---|---|
| 2,384,994 | * | 9/1945 | Gutman et al. ........................ 52/98 X |
| 3,394,525 | * | 7/1968 | McKee et al. ........................... 52/726 |
| 3,950,109 | | 4/1976 | Smith . |
| 4,084,720 | | 4/1978 | Thurston . |
| 4,093,167 | | 6/1978 | Rooklyn . |
| 4,567,930 | | 2/1986 | Fischer . |
| 4,572,695 | | 2/1986 | Glib . |
| 4,602,470 | * | 7/1986 | Stuart et al. ........................ 52/638 X |
| 4,637,195 | * | 1/1987 | Davis ..................................... 52/693 |
| 4,665,838 | * | 5/1987 | Minshall .............................. 108/111 |
| 4,912,903 | * | 4/1990 | Mogami et al. ..................... 52/653.2 |
| 5,010,709 | | 4/1991 | Paz . |
| 5,029,421 | * | 7/1991 | Nielsen .............................. 52/638 X |
| 5,046,777 | * | 9/1991 | Garnweidner et al. .............. 52/98 X |
| 5,149,221 | | 9/1992 | Slapsys . |
| 5,156,484 | | 10/1992 | Allen . |
| 5,383,723 | * | 1/1995 | Meyer ............................. 52/655.1 X |
| 5,606,837 | * | 3/1997 | Holizlander ........................... 52/693 |
| 5,664,388 | | 9/1997 | Chapman . |

* cited by examiner

Primary Examiner—Carl D. Friedman
Assistant Examiner—Phi Dieu Tran A
(74) Attorney, Agent, or Firm—A. R. Eglington

(57) ABSTRACT

A rigid tubular member of variable length and rectangular cross-section adapted to be sized, flared and conjoined with at least one other rigid member to create a variety of tubular member frameworks for greenhouse construction, and the like. Each member is provided with a plurality of elongate, linear groovings, either located proximal to, or coincident with, the external and/or internal elongate seams of the member, with the inscribed sets of groovings are such being of a depth sufficient to facilitate separation under manual force of at least one, up to four, of the end sidewall segments, providing flared end segments, either disposed at right or acute angles, which segments are adapted to be fastened to another rigid member in any of several locations, along it, in the course of a framework erection.

21 Claims, 15 Drawing Sheets

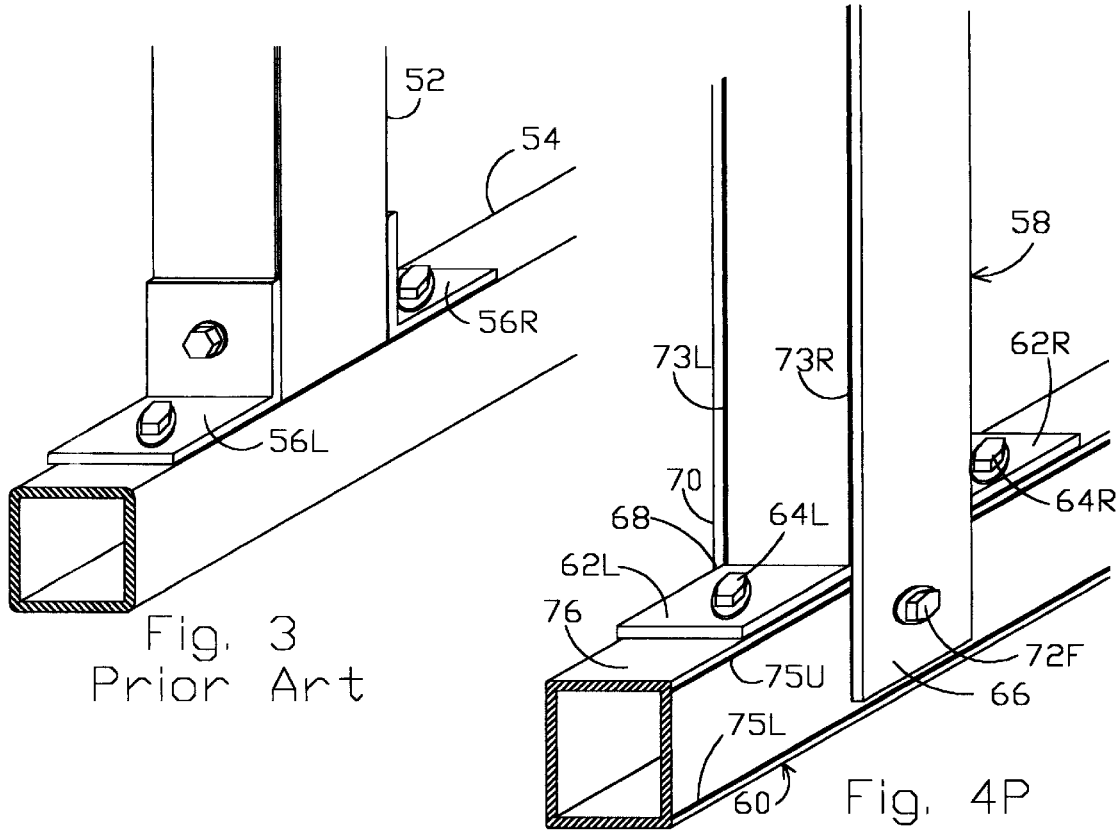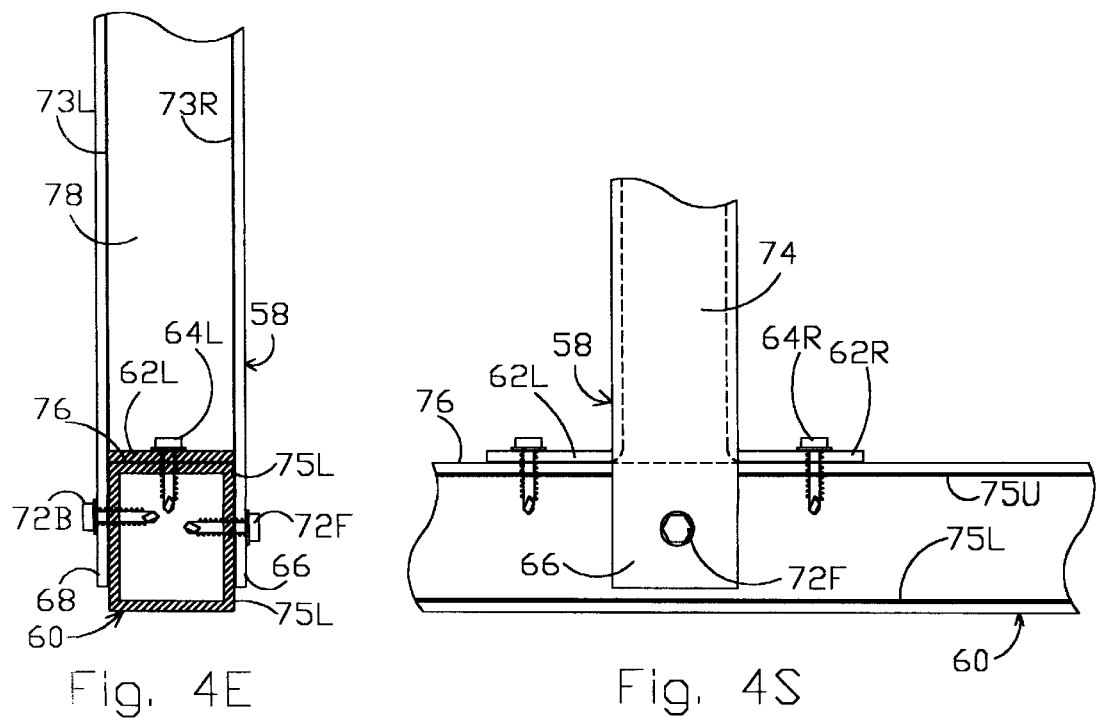

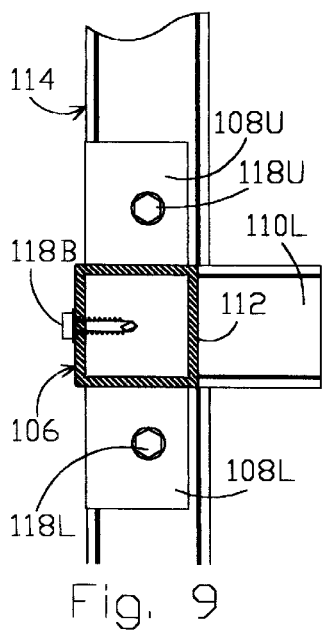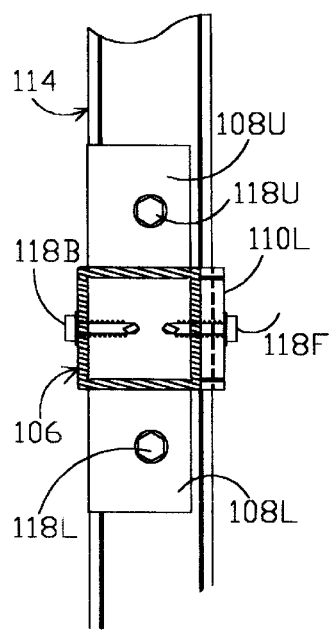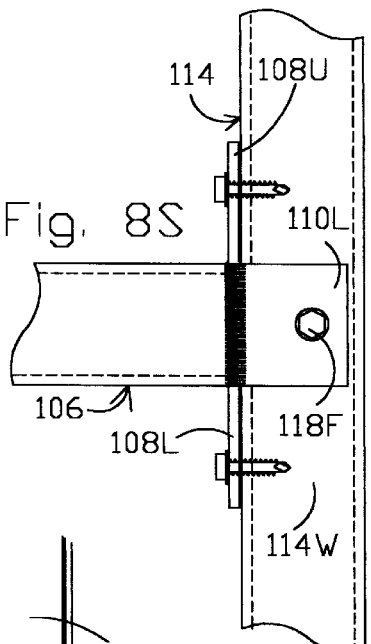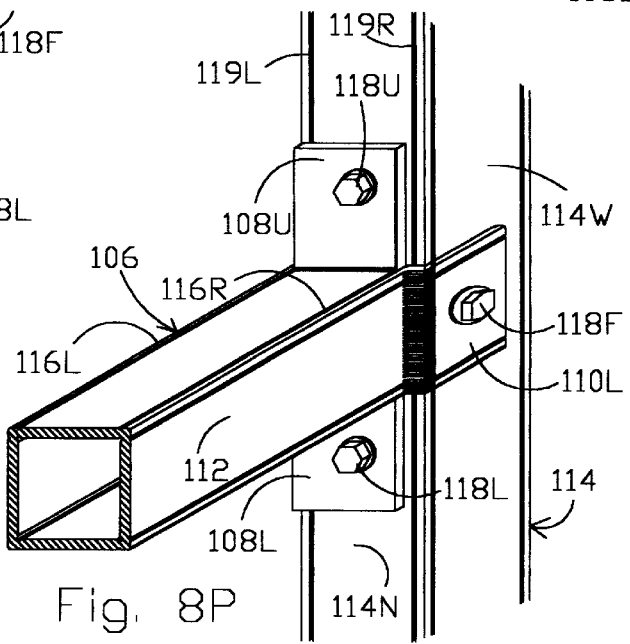

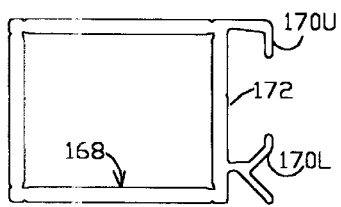
Fig. 18
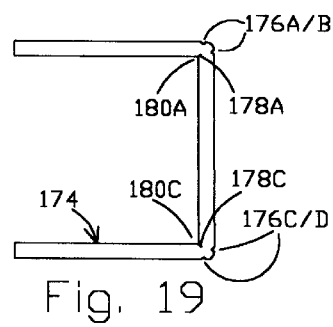
Fig. 19
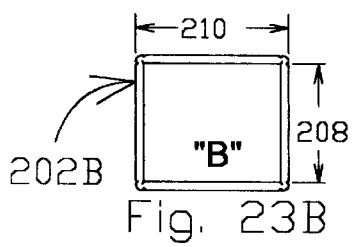
Fig. 23B
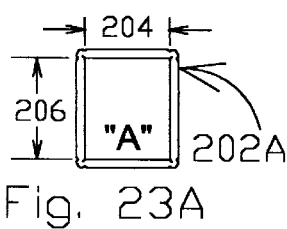
Fig. 23A
Fig. 20
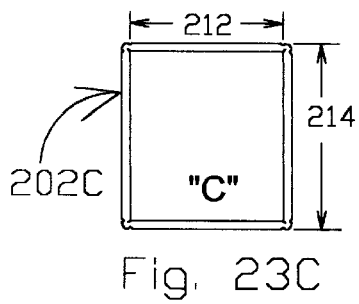
Fig. 23C
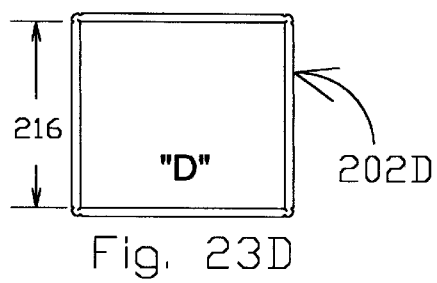
Fig. 23D
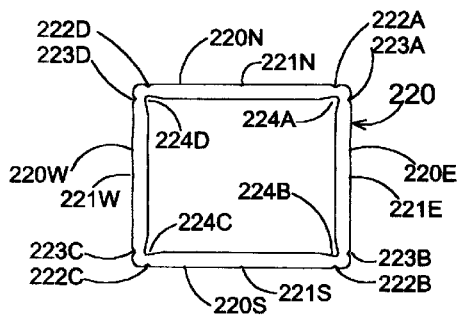
Fig. 24A
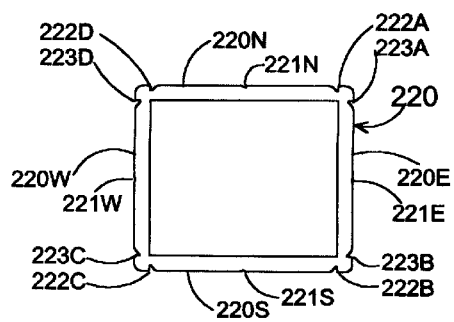
Fig. 24B

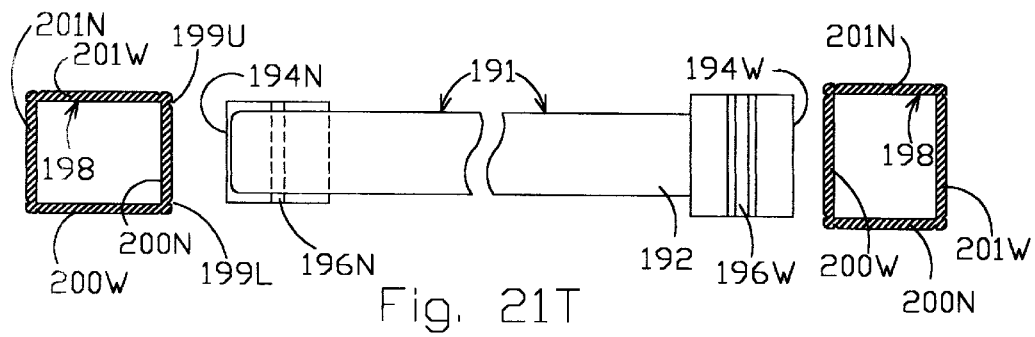
Fig. 21T
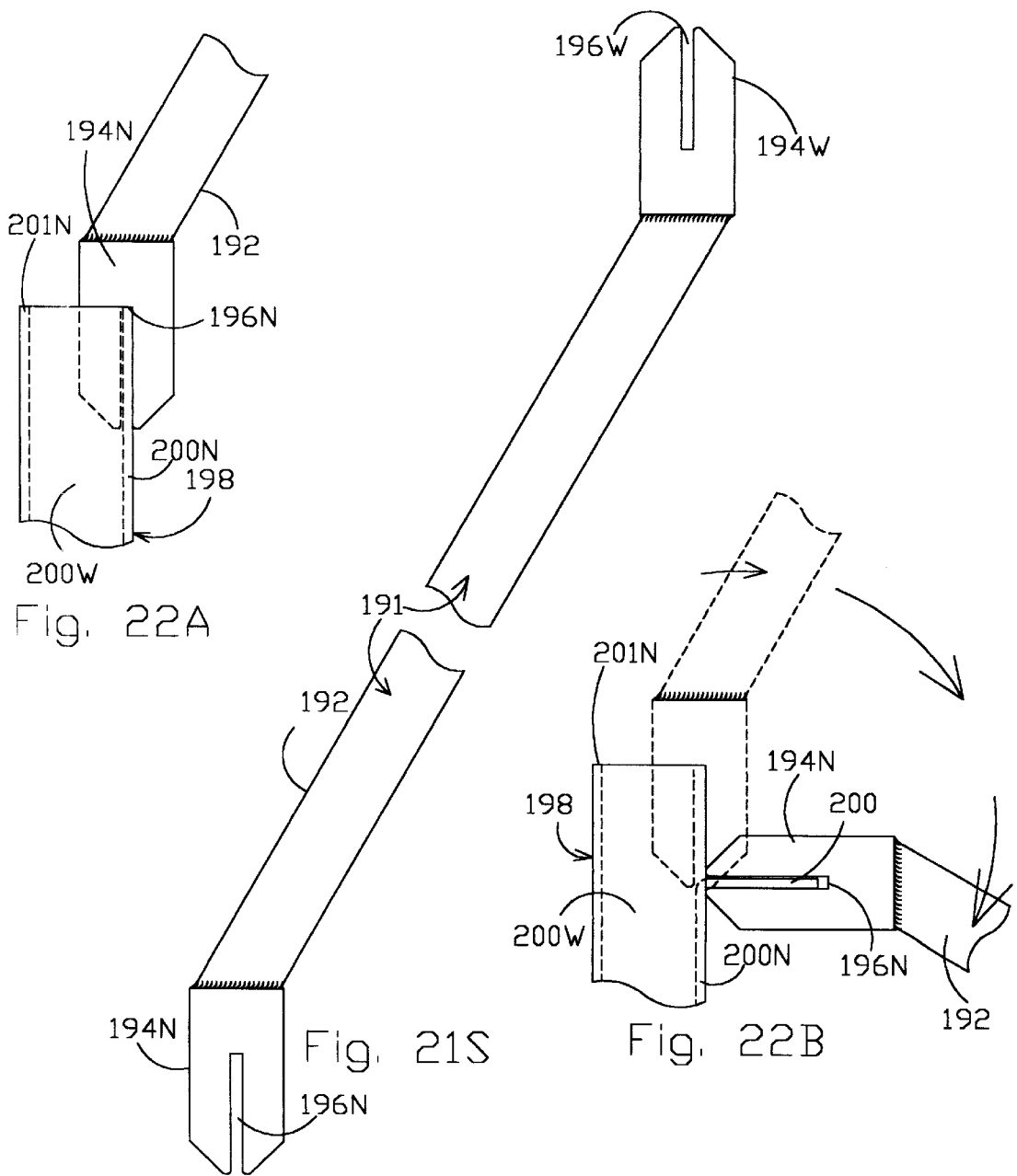
Fig. 22A
Fig. 21S
Fig. 22B

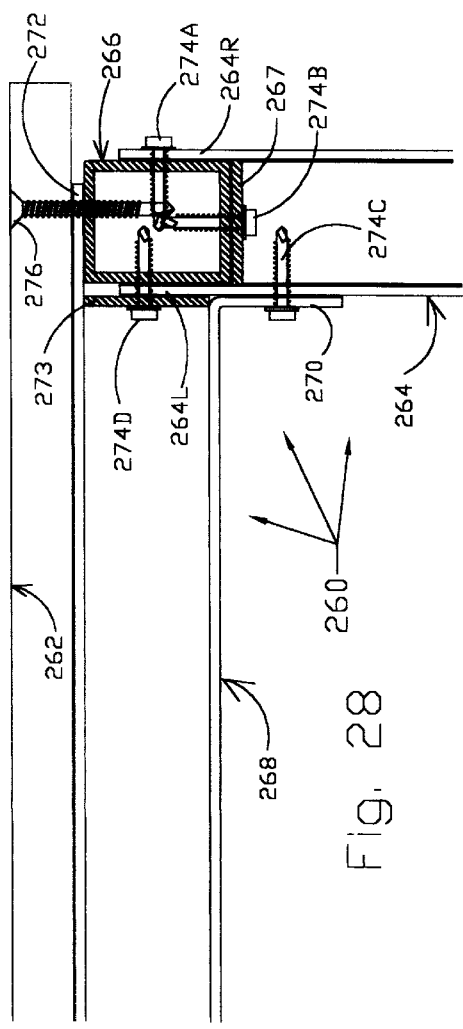
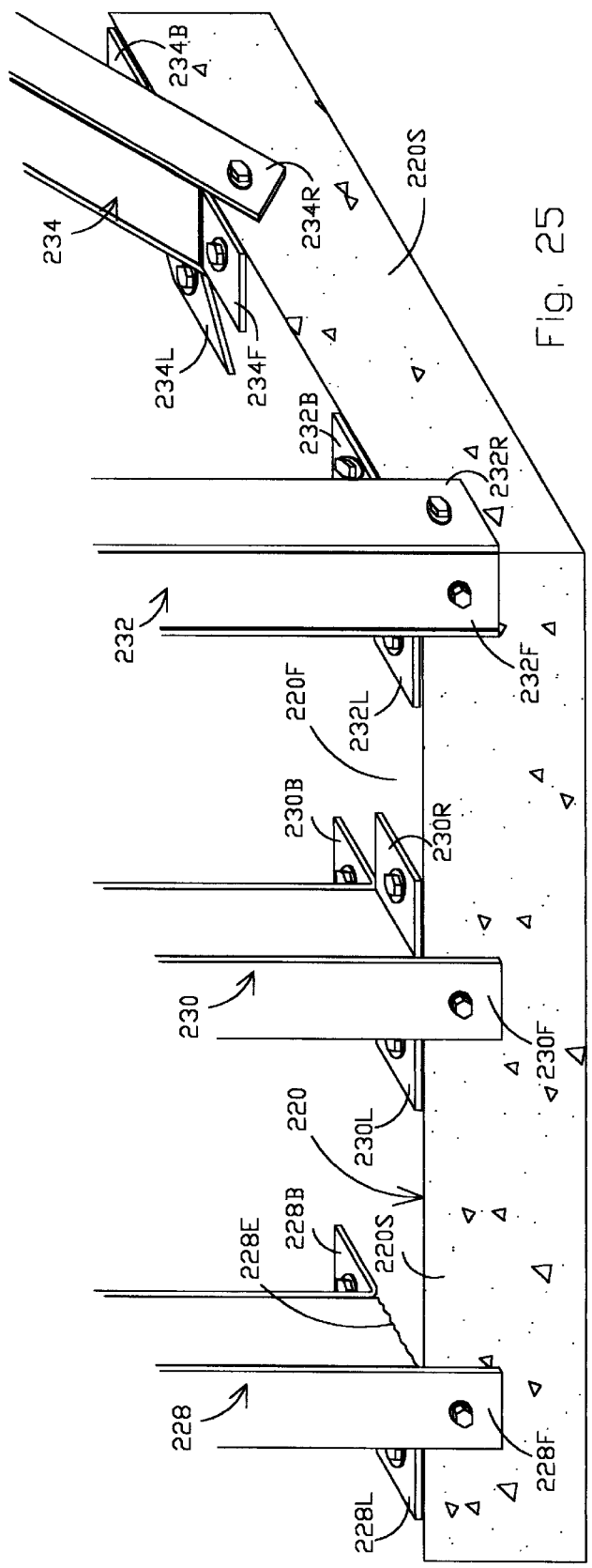

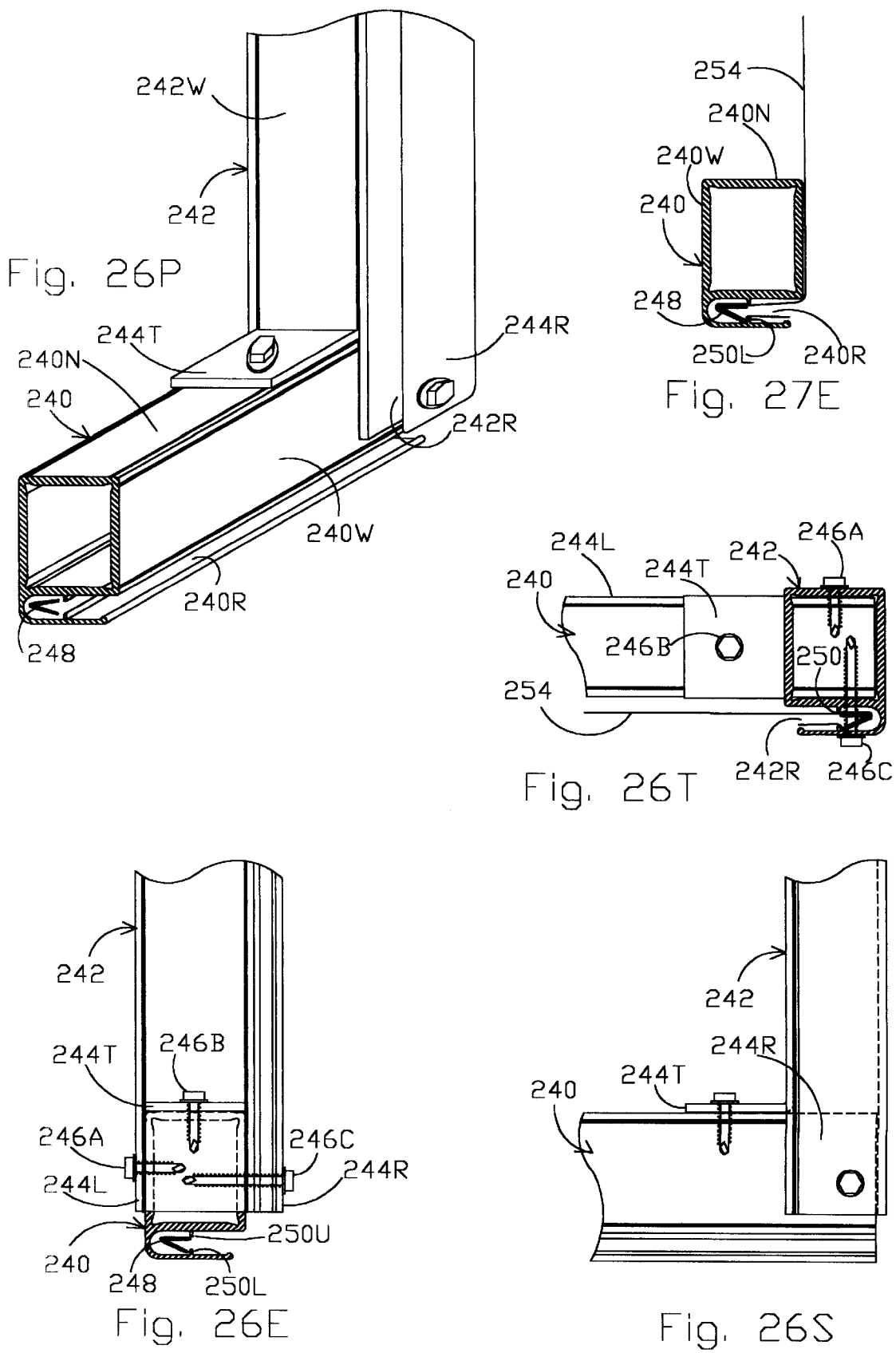

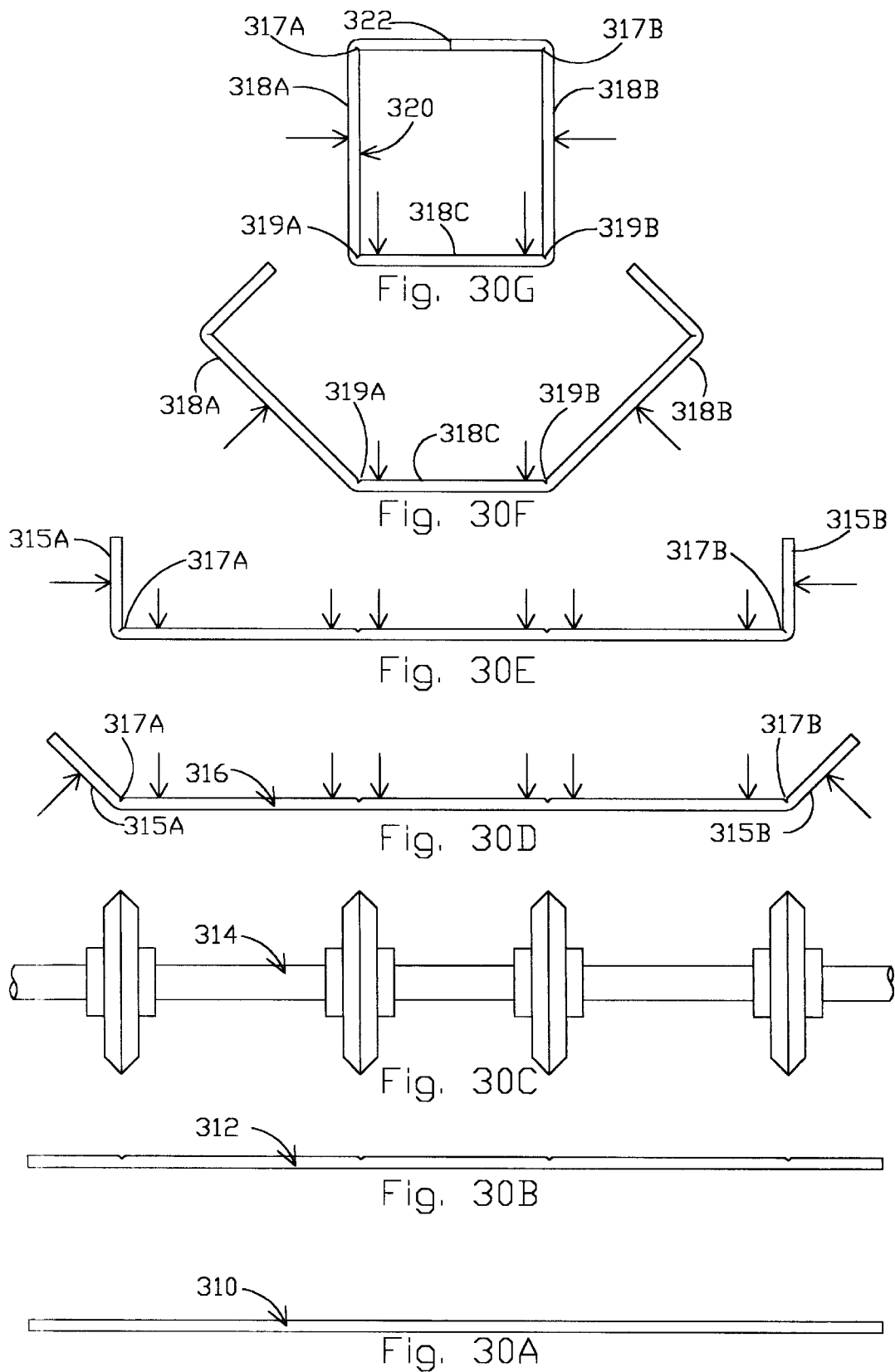

STRUCTURAL TUBING MEMBERS WITH FLARED OUT END SEGMENTS FOR CONJOINING

CROSS-REFERENCE TO OTHER APPLICATIONS

This is a regular patent application submitted for a filing receipt under 35 U.S. Code Section 111(a). It claims priority from a provisional patent application submitted under 35 U.S. Code Section 111(b), accorded Ser. No. 60/081,869, filed Apr. 16, 1998.

FIELD OF THE INVENTION

The field of the invention are hollow structural metal or rigid members that are generally rectangular in cross sectional shape but with two opposing sides slightly wider than the other two opposing sides and with linear grooving formed near or upon the seams for the purpose of selective and controlled flaring of the tubing ends.

BACKGROUND OF THE INVENTION

Many modern greenhouses utilize elongated metal hollow tubing to construct various elements of the structure. Both square and rectangular cross-sectional shapes are utilized, as well as round and elliptical shapes. These are usually standard in cross sectional size, and typically measured by the outside dimensions of the cross-section.

Several wall thicknesses of steel are available in standard gauge dimensions (such as 12 gauge, 14 gauge, 16 gauge, etc.) to allow for a wide range of structural strength combinations. When hollow structural tubes are created from rigid materials that can be extruded, (such as aluminum or plastic), or from cold rolled, steel sheeting; the range of wall thicknesses is limitless.

Most of these structures are assembled on site, in an erector-set-like fashion. In many cases, erection is performed by employees of the owner of the building, who are non-experts the practice of building structures. They also usually have limitations on the tools available to them; although, standard wrenches, drills, saws, etc. needed to build an erector set are usually available and familiar. Because the height of walls and rough opening sizes for equipment needing to be installed usually vary from structure to structure, tubing members are usually shipped in long standard lengths. Measurements are then taken on site as the structure is built, and the standard tubes are cut down to the desired lengths.

A typical gable end of a greenhouse will usually be formed by a series of vertical hollow tubes being mated to horizontal hollow tubes to create openings for necessary fans, shutters and doorways. Most of these junctures of tubing members create 90° angled to interconnections, and usually employing 90° angle brackets. The typical angle bracket is usually first bolted, or otherwise fastened, to the side of a vertical post and then the horizontal member is fastened to the other side of the 90° angle bracket. If two angle brackets are used at a joint, this basically creates a two point mechanical junction at the joint (even if more than one fastener is used in each side of each 90° angle bracket).

The roof line of many greenhouses presents a Quonset-hut type or a bowed roof outline. When the vertical hollow tubing meets the outline of the roof bows, the junctions that are created form angles less than, or greater than, 90°. These angles change consistently along the roof bowing. The use of 90° angle brackets to form connections that are not 90°, are just not practical. In those cases, specially adapted end brackets are needed to join the vertical or horizontal members to the changing angles of the roof bow. These special brackets also rely on fasteners to clamp the special bracket to one or both sides of the bow, and then fasteners to connect the bracket to the vertical or horizontal structural member. This resulting connection of the prior art also usually results in a two point mechanical junction at the joint.

It is a principal object of the invention to provide a tubing member that can utilize an end portion of it's own length of material to readily construct an interconnection with another tubing member of the same cross-sectional size, using standard and readily available fasteners, but without the use of 90° angled or special brackets, and without the need for welding these members to each other.

It is another object of the invention to provide biasing grooves continuously along the longitudinal dimensions of the tubing, to selectively allow the end sides of the tubing to be split away and then flared outward, in a controlled manner, so as to create the fastening flanges that allow the two tubes to be reliably conjoined together at various angles of inclination.

A further object of the invention is to allow the internal dimension of two opposing longitudinal sides of the tube to be equal to, or slightly exceed, the external dimensions of the other two opposing longitudinal sides which will enable the two unflared ends of the tube to is span and overlap(?) the narrower dimension of the same sized tube.

A yet further object of the invention is to allow the person who is erecting the new structure to utilize one sized (squared or rectangular cross-sections) structural members to create both horizontal posts and vertical beams without needing various sized structural members, or various sized brackets, for accomplishing variously angled connections.

A still further object of the invention is to allow the installer to create end joints and tubing interconnections mechanically with simple fasteners that result in a three or four point mechanical interconnection on many junctures.

Another object of the invention is to create stable multi-rigid tubing interconnections that allow the external surfaces of the completed structure to be relatively free of protruding lugs and edge brackets, which protrusions would hinder fastening of sheet-like materials over the framed structure.

Still another object of the invention is to allow the tube to selectively allow the sides of the tubing to be split away and then flared outward, in a controlled manner, so to create the fastening flanges that allow the tube to be reliably conjoined with flat surfaces or the edges or corners of flat surfaces.

Still another object of the invention is to allow the tube to selectively allow the sides to of the tubing to be reliably conjoined with structural members that are rounded, elliptical, angular, larger, or smaller than the tube.

SUMMARY OF THE INVENTION

The present invention provides improved hollow structural tubing members that are adapted to allow integral interconnection flanges to be easily fabricated from the longitudinal ends of the tubing, by selectively flaring out one or more of the sides of the tube. The tubing, in a preferred embodiment, will be made having a basically square, or rectangular, cross-sectional configurations. The internal corners will not have much of an internal radius so that they form substantially 90° corners. In the preferred embodiment, one pair of opposing internal sides of a given tubing will have an inside dimension that is the same as, or slightly exceeds, the external dimension of the other two opposing sides.

Elongate, linear grooves are formed into the longitudinal planar walls of the tube, either internally or externally, or both. These grooves will be located proximal to or at the elongate seams of the tube, along the elongated corners of the tube. Such grooves are specifically provided to weaken the tubing walls at precise points (edges) near the corner seams. This feature will provide shear line(s) along these grooves. A special flaring tool, will be employed, which will have a slotted chamber in the tool working face, that allows it to readily extend over the somewhat variable wall thickness of the tubing. When this special tool is inserted inside the longitudinal end of the tube, and is projecting over one of the sidewalls of the tube, and while the tube is held firmly in place, as in a vice, a levering force is exerted on the handle end of the tool in an outward arcuate direction from the tube. The grasped side of the tube will split outwards, breaking away cleanly from the two adjoining sides of the tube, that are otherwise integral, at 90° angles to the one side being split away. The linear grooves will assure that the side splits away along the weakening grooves, resulting in the tube end bending outwards (or flaring) of the side that is being split away. The angular degree to which such split side is flared out will readily conform to the angle desired for the flange to provide an interconnection with another structural member or surface, either at a right angle or an inclined one.

BRIEF DESCRIPTION OF THE DRAWING (22 FIGS.)

FIG. 3 is perspective view depicting a prior art mode of conjoining two rectangular section, tubular members at a right angle, using dual 90° angle brackets;

Figure 5:
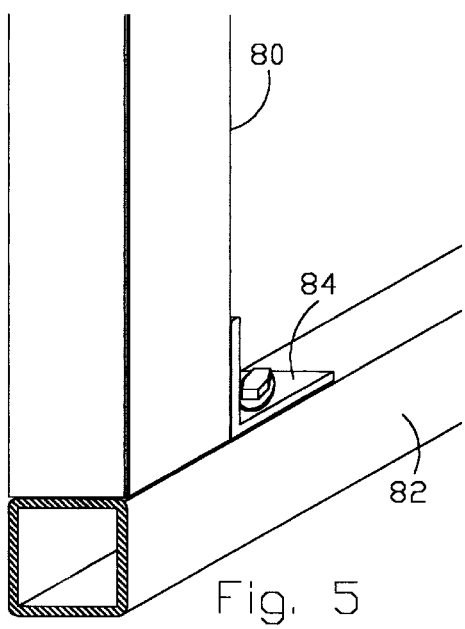
Figure 6P:
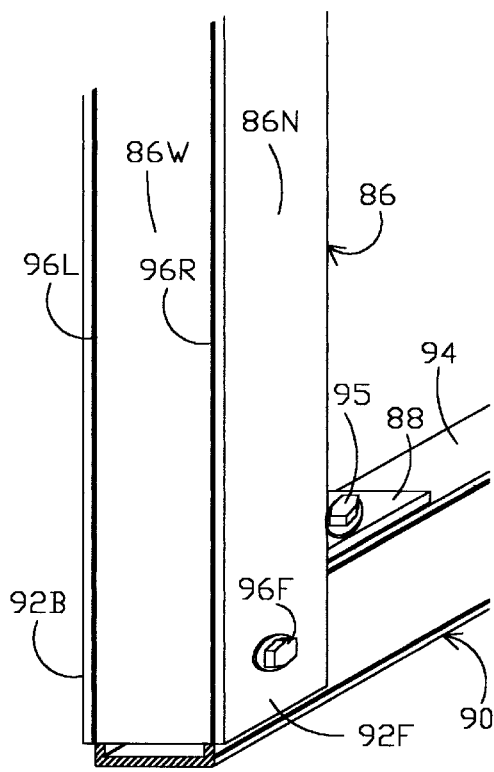
Figure 6E:
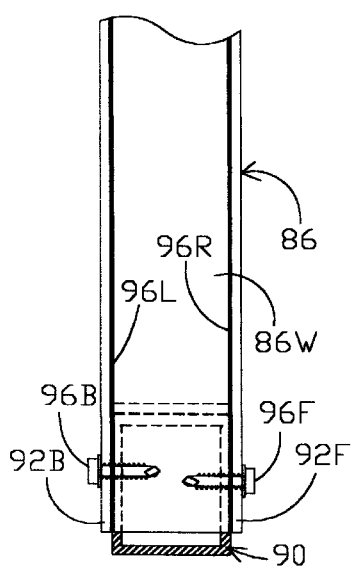
Figure 6S:
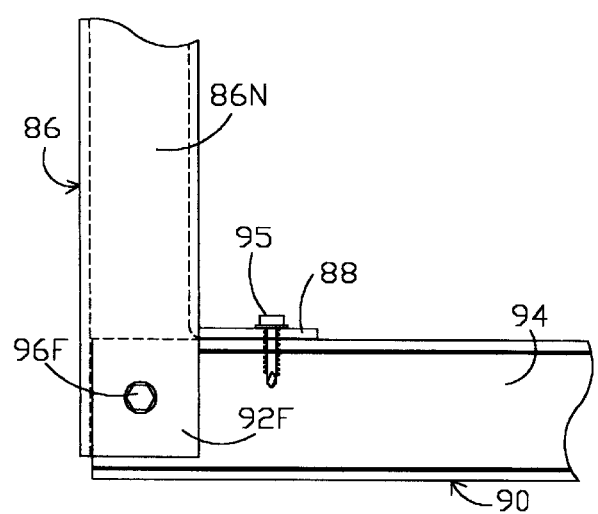
Figure 11T:
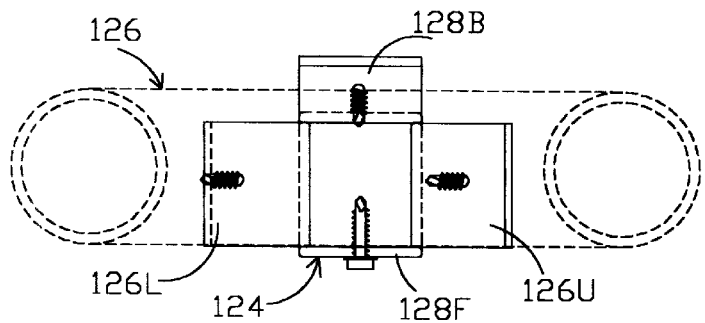
Figure 11S:
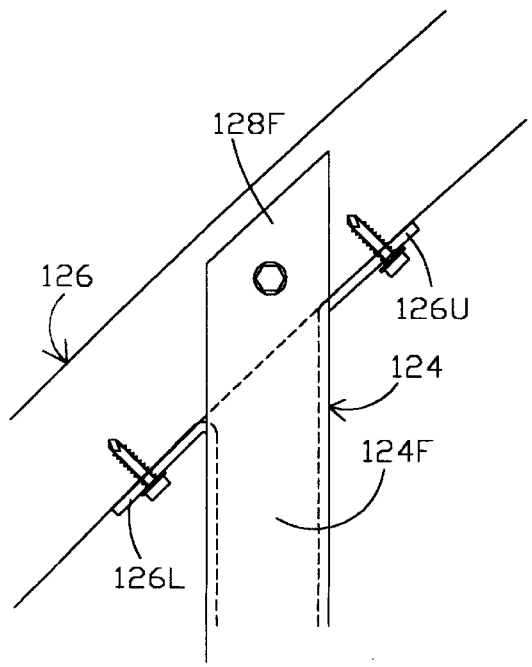
Figure 11E:
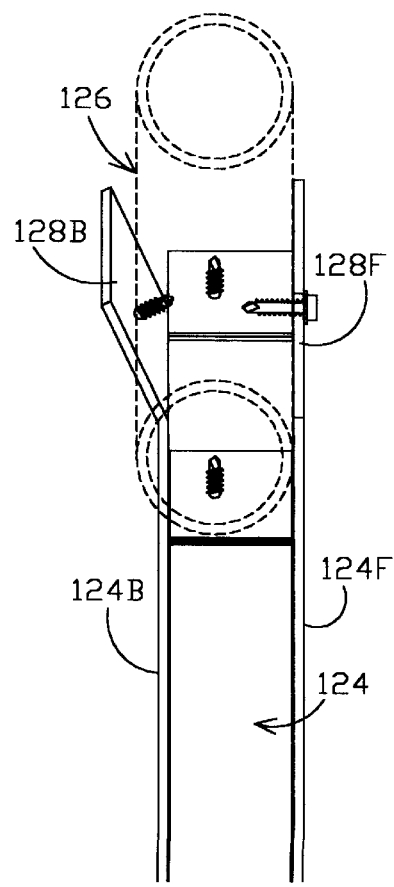
Figure 12E:
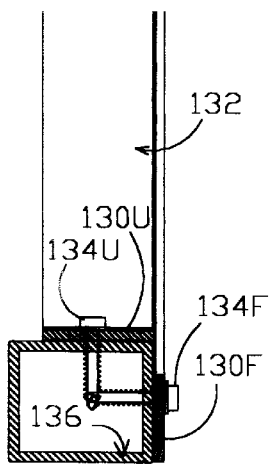
Figure 12P:
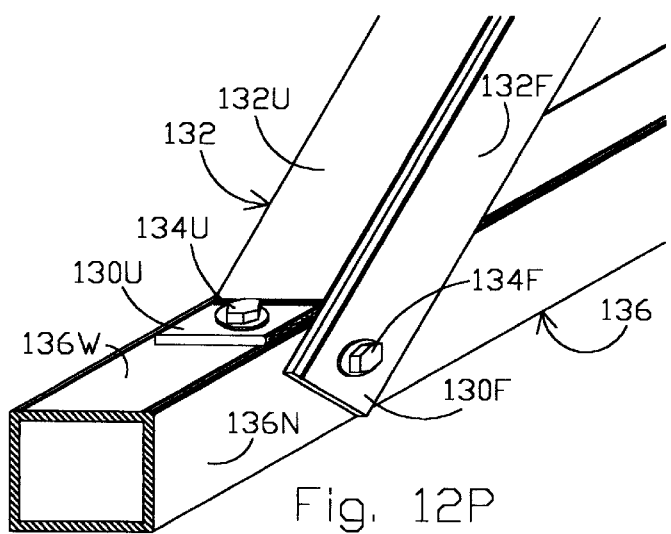
Figure 13S:
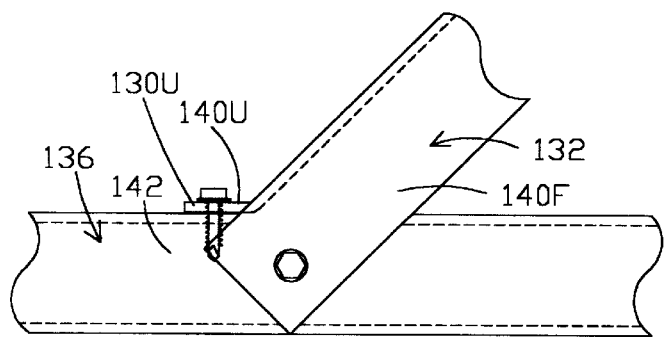
Figure 13E:
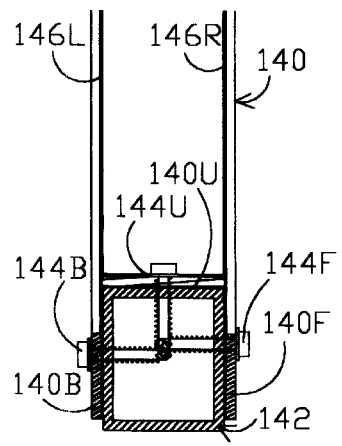
Figure 13P:
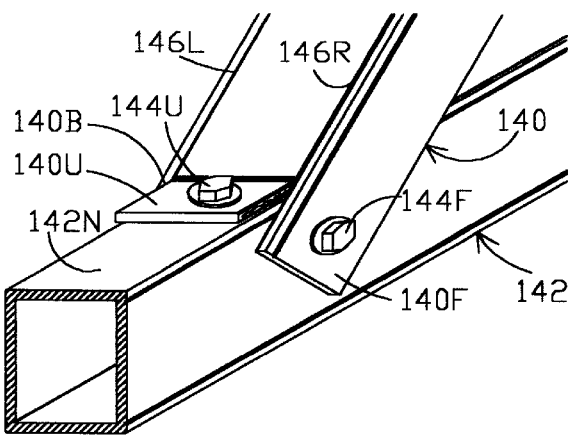
Figures 14R, 14S:
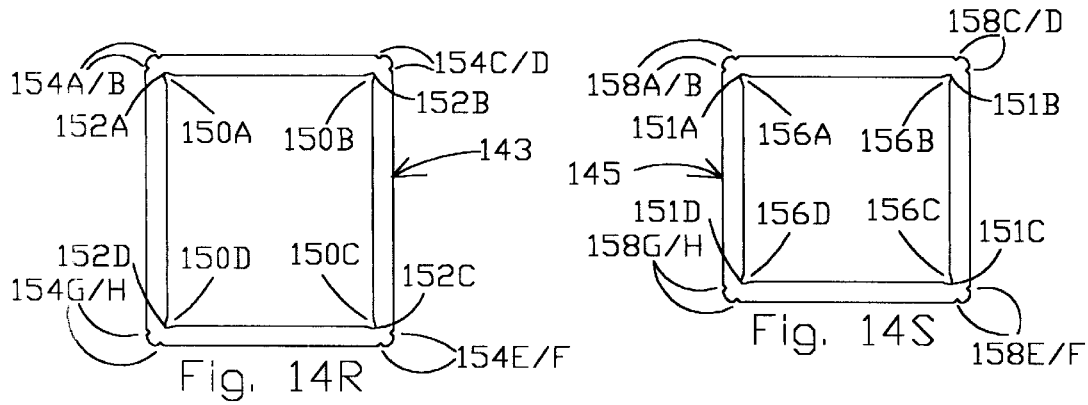
Figures 15R, 15S:
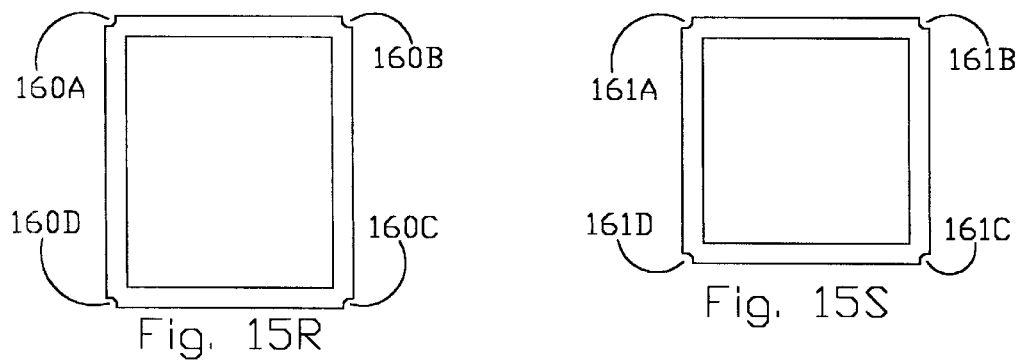
Figures 16R, 16S:
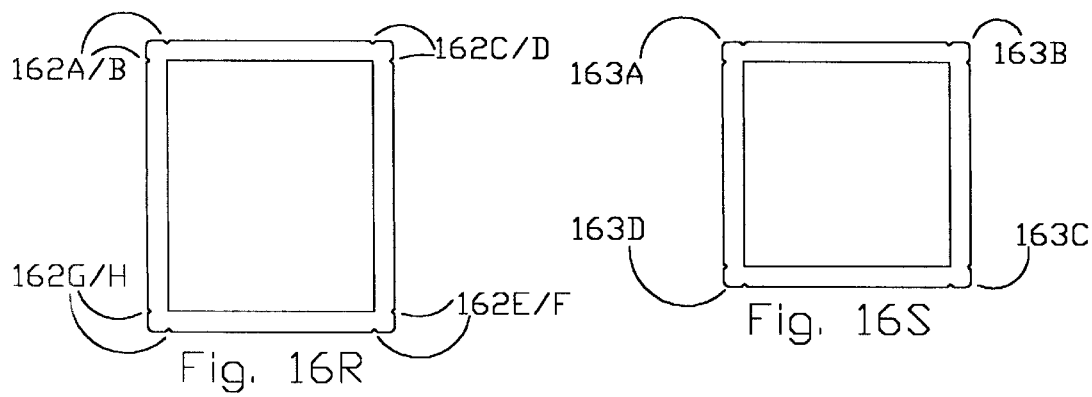
Figures 17R, 17S:
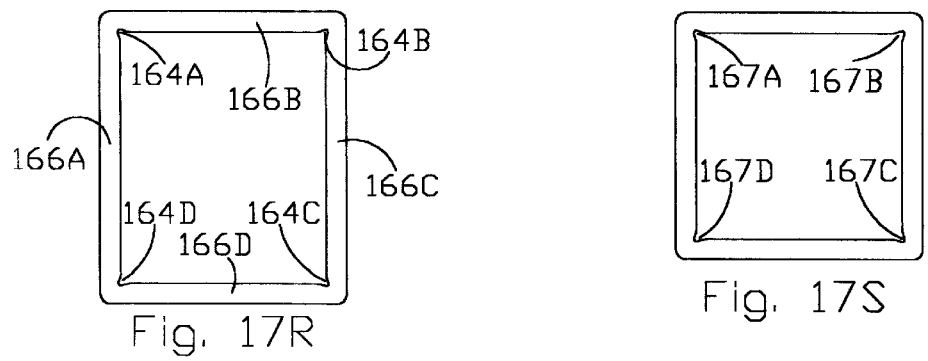

FIGS. 4P, 4S, and 4E are perspective, side elevational, and longitudinal end views, respectively, of a first embodiment of the present invention, depicting an improved mode of conjoining certain tubular members of dissimilar cross dimensions;

FIG. 5 is a perspective view depicting another prior art mode of conjoining two rectangular members at a right angle at their longitudinal ends using one angle bracket of 90°;

FIGS. 6P, 6S, and 6E are perspective, side elevational, and longitudinal end views, respectively, of another improved mode of conjoining tubular members at the longitudinal ends of a pair of them;

FIG. 7 is a perspective view depicting a prior art mode of conjoining two members at a right angle, like that depicted in FIG. 3 using dual brackets, but now having been rotated spatially 90°;

FIGS. 8P, 8S, and 8E are a perspective, side elevational, and longitudinal end views, respectively, of another mode of conjoining at a right angle two rectangular, tubular members, which are each of substantially the same cross dimensions (squared);

FIG. 9 is an end elevational view of the next to final step for providing the single stepped-out finger-like end flaring (first stage) that overlaps the vertical member, with the results as seen in FIG. 8E;

FIGS. 10B and 10P are successive perspective views of one longitudinal end of a prior art rectangular tubular member, before and after cold working, which member lacks the groovings pretreatment feature of the present invention, but where an abortive effort was made to provide a discrete single flared finger, by mechanical leveraging;

FIGS. 11S, 11E, and 11T, are end, side, and top elevation views, respectively, of the conjoining of two tubular members, one of this invention, mated to a prior art round tube, at acute/obtuse angles;

FIGS. 12P and 12E are perspective and end views, respectively, of one angular member conjoined to one tubular member in a planar mode, at an interior acute angle, with flanges to be drawn from the one longitudinal member angled end, presenting one flared finger (and one sidewall) of the inclined member, serving as the dual areas of attachment to the horizontal tubular member;

FIGS. 13P, 13S and 13E are perspective, side elevation, and end elevational views, respectively, of one mode of conjoining one channel member (three sides as in FIG. 19), to one tubular member, being oriented acute angularly, now presenting three flared fingers, with the flanges all drawn from the one longitudinal channel member end, as projecting and providing three areas of attachment to the horizontal tubular member;

FIGS. 14R and 14S are longitudinal end views of a pair of tubular members, one of a rectangular cross section and the other of a squared cross section, each being provided with a plurality of longitudinal grooving lines coincident with (or proximal to) the elongate seams, on both of the inner and outer surfaces of the two members;

FIGS. 15R and 15S are longitudinal end views of another pair of members (rectangular and squared cross sections, respectively), each being provided with only a configuration of external grooving lines, located coincident with the elongate outer seams of each of such members;

FIGS. 16R and 16S are longitudinal end views of two tubular members (rectangular and squared cross sections, respectively), being provided with paired sets of longitudinal groovings, each pair bracketing the outer elongate seams of such members;

FIGS. 17R and 17S are longitudinal end views of two tubular members (of rectangular and squared cross sections, respectively) provided with elongate groovings, but only provided along the internal seams, with each linear grooving being located at each elongate corner of such member;

FIG. 18 depicts a tubular member of a rectangular cross section, now provided on one planar surface with two dissimilar, laterally projecting, hooked ledges, which ledges are adapted to receive an elongate wire spring element (not seen), which spring will serve to retain any overlapping sheeting (not seen) within the single sidewall external channel of the tubular member;

FIG. 19 is a three sided channel member of rectangular cross section, provided with both inner and outer longitudinal groovings located along its two elongate seams, having configurations like the groovings of FIGS. 14R/S;

FIG. 20 is a two sided L-angle member provided with inner and outer longitudinal groovings, along its single elongate seam, like those of FIG. 19;

FIGS. 21S and 21T are side and top elevational views, respectively, of a elongate levered tool used for exerting a selective shearing force upon an open tubular end of a tubular member of the present invention and thus effecting the flared fingers, such as are depicted in FIGS. 4P, 6P, 8P, 11S, and 12P and 13P; and FIGS. 22A and 22B depict successive steps for the rotational shift of the tool of FIG. 21S after downward exertion, which produces a first outwardly projecting flange at one longitudinal end of a tubular member of the invention, and at any others, as needed.

Figure 1:
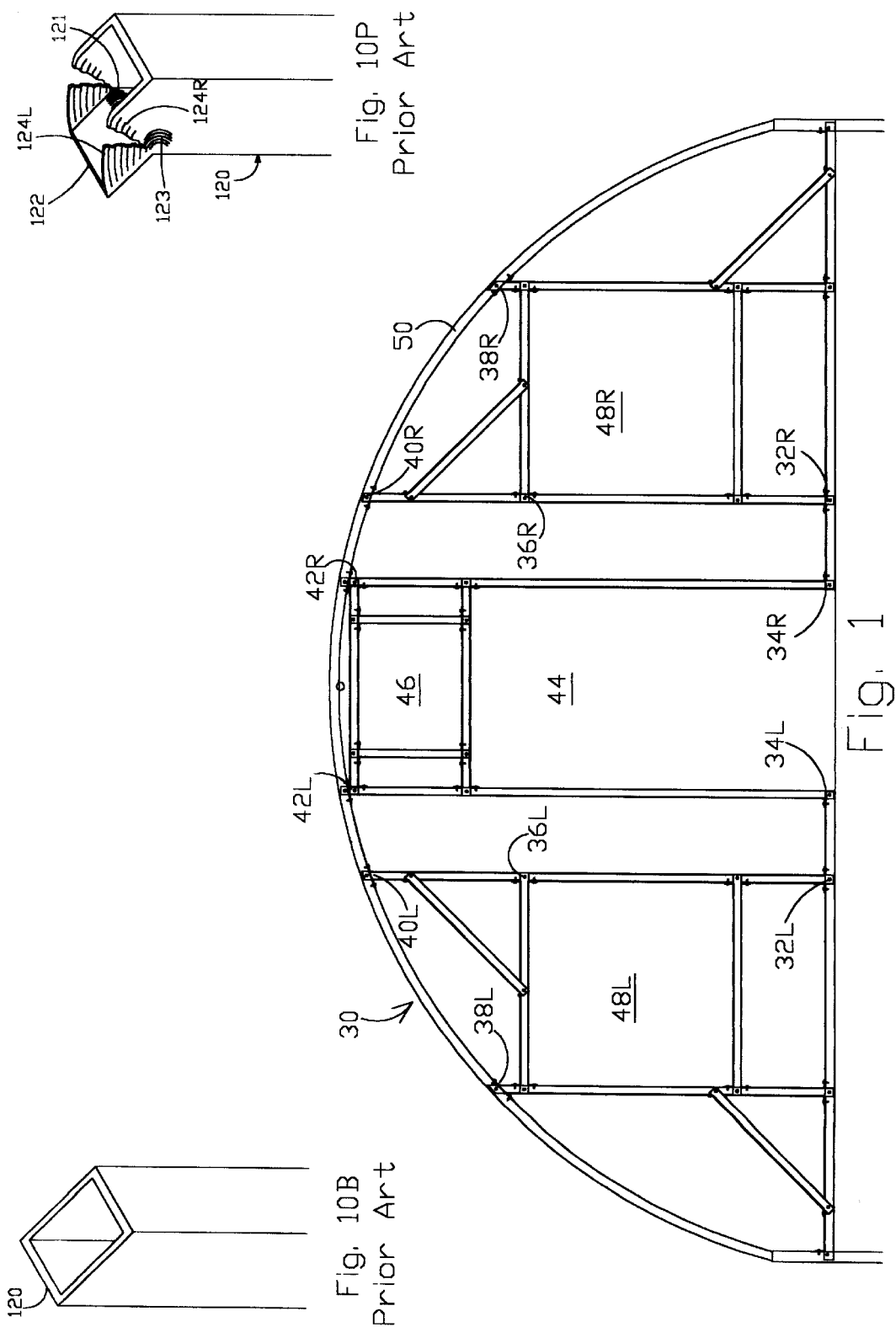
FIG. 1 is a gable end view of a contemporary greenhouse having an arcuate-roofed structure, employing in tie structural framing, a variety of the tubular members of the present invention.

FIGS. 23A, 23B, 23C, and 23D are a longitudinal end views of a complemental set of rectangular cross-sectioned, tubular members, dimensioned to be snugly end-fitted one to another, when fabrication needs invite use of variably dimensioned tubings in a construction like that of FIG. 1;

FIGS. 24A and 24B are longitudinal end views of the similar tubular member having a rectangular cross-section and paired sets of external longitudinal groovings, with FIG. 24A denoting the internal longitudinal groovings located proximal to the external groovings and the location of external midwall, longitudinal groovings. FIG. 24B denotes sets of external pairs of groovings omitting the internal groovings;

FIG. 25 is a perspective schematic view of how a single stock tubular member can be variably end-modified (four variations) to provide both flared and lapped fingers for conjoining the member relative to an underlying linear edge of a mounting surface;

FIGS. 26P, 26T, 26S, and 26E are perspective, top elevational, side elevational, and end elevational views, respectively, of a longitudinal ends conjoining of a pair of tubular members, each identically modified to include a longitudinal dimension, elongate recesses (or chambers), which recesses are also adapted to receive a depicted elongate spring clip, that will serve to retain a tucked-in sheeting (not seen);

FIG. 27E is a longitudinal end view of the horizontal member of FIG. 26P, now isolated from the conjoined vertical member of FIG. 26E, depicting an example of how tubing can be extruded in one piece with secondary uses built into the extrusion, in this case, for an elongate spring clip that is retained therein while it engages a flexible sheeting (not seen);

FIG. 28 is a side elevational view (partly in vertical section) of three tubular members, but now conjoined at right angles to provide a skeletal framework for an overlying wooden work bench.

FIGS. 29A to F depict the variety of end flange segments, producible from the longitudinal ends of a rectangular cross section tubing (See. FIG. 14R) for both right angle and acute angle conjoining to planar surfaces, like walls or ceilings;

FIGS. 30A to 30G depicts the sequence of steps involved in converting a stock steel sheet to a rectangular cross section tubular member provided with a single longitudinal seam at each internal corner seam of the member (groovings provided on the inwardly folding surface); and, FIGS. 31A to 31F depicts the sequence of steps involved in converting a stock steel sheet to a rectangular cross section tubular member provided with a single longitudinal seam at each external corner seam of the member (the groovings initially provided on the outwardly folding surface).

DESCRIPTION OF PREFERRED EMBODIMENTS

In the gable end elevation view of a greenhouse structure (FIG. 1), a plurality of conjoined tubular members are depicted, involving both of arcuate and linear members, with right angle and acute/obtuse angle interconnections being provided. Gabled end 30 has: at least two right angle squared member unions, located intermediate of the longitudinal ends of horizontal members, such units as 32L and 32R; a right angle, squared member union located at the longitudinal ends of two tubular members, like 34L/R; plural right angled, member unions, located intermediate of the ends of the vertical members, like 36L/R; plural acute-angled, unions of two members, intermediate of the longitudinal ends of one inclined member, like lower 38L/R, like middle level 40L/R, and upper level 42L/R members; Framed larger rectangular opening 44 would serve as a door position; higher rectangular opening 46 would serve as a fan-jet opening (intake shutter); left side, squared opening 48L serves as a fist exhaust fan (not seen) opening, and opening 48R serves as a second exhaust fan (not seen) opening. The elongate arcuate member 50 would present a uniform roof bow which will support the affixing of planar roof panels, or flexible sheeting (not seen), like the known Quonset style modules.

Figure 2:
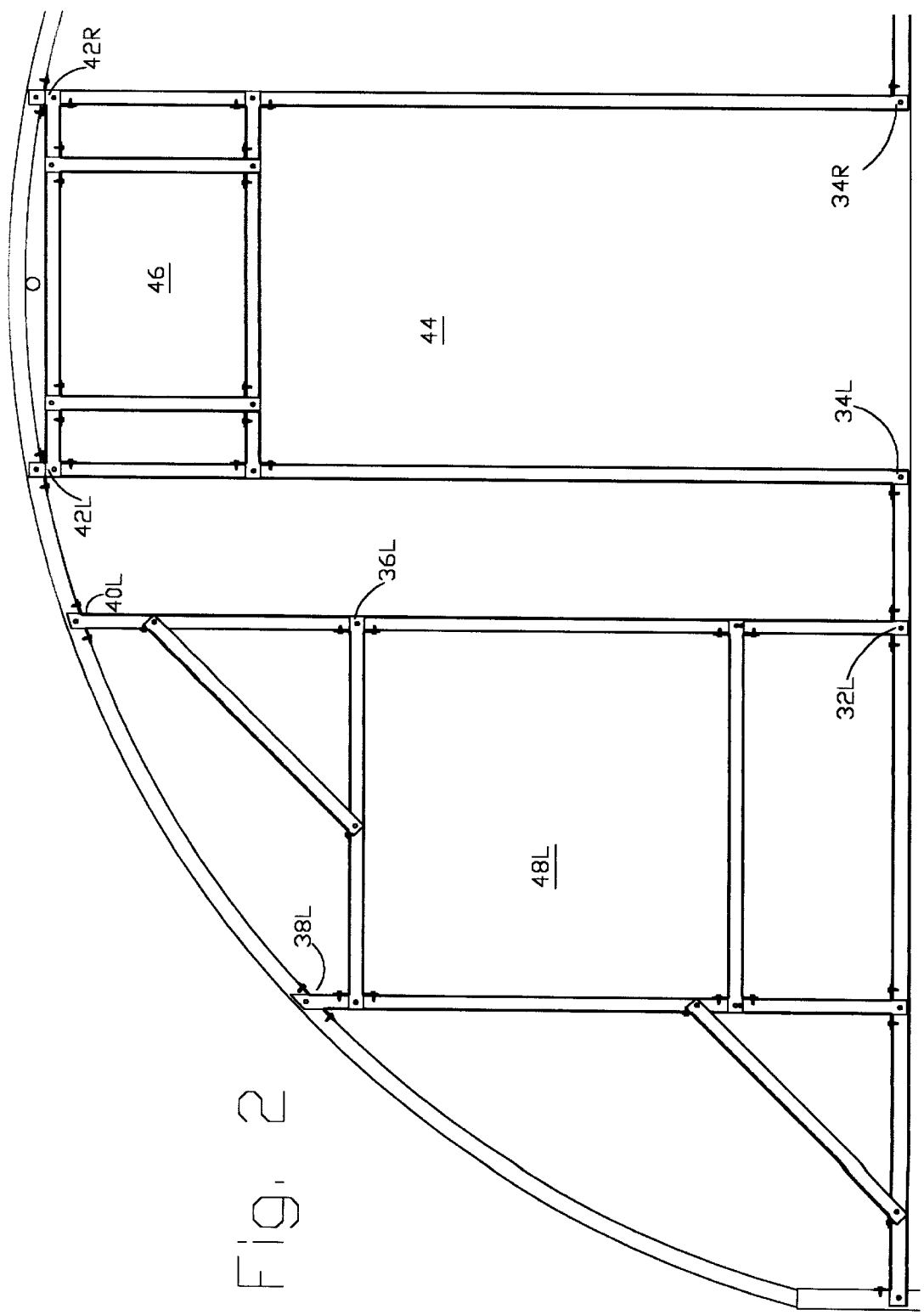
FIG. 2 is an enlarged, fragmentary end view of the end structure of FIG. 1, depicting same with some greater resolution.

The broken-out side elevational view of FIG. 2 also depicts the plural, varied angle conjoining of tubular members of the present invention fabricated according to the present invention, in greater detail.

In the perspective of FIG. 3 is depicted a typical joinder means of two tubular members 52 and 54, according to prior art practice. Two opposing L-brackets, 56L/R, are the sole means of holding members 52 and 54 together, but providing strength only in the direction of the plane defined by such conjoined tubular members.

In FIGS. 4P, 4S, and 4E (perspective, side elevation and end elevation, respectively), are shown exemplary rectangular hollow tubular members, 58 and 60 in which the wider outside side dimension is 1.78:, the narrower outside side dimension is 1.5", the wall thicknesses are ⅛", and the inside dimension of the wider side is 1.53", or slightly wider, than the outside narrower side dimension.

In the perspective view of FIG. 4P, a four way conjoining of two right angled, tubular members, 58 and 60, is seen. The lower longitudinal end of vertical member 58 has been preworked to provide two opposing fingers, 62L and 62R, produced by a longitudinal end flaring-out tool means, to be disclosed later. These fingers provide bolting platforms for screw fasteners, like 64L and 64R. The remaining two sidewall fingers, 66 and 68, are integral extensions of the upper member 58 lower end 70. They serve to snugly straddle the underlying horizontal member 60. These laterally aligned sidewalls (66/68) are also the platforms for two other fasteners, like 72F and 72B (in FIG. 4E), which then provide a tube connection strength in all four directions. The linear groovings 73L/R are seen in both of FIGS. 4P and 4S. Linear groovings, 75U/L, are seen in both FIGS. also.

In the side elevational view of FIG. 4S, the narrower cross-dimension 74 (typically 1.5" on this exemplary view) of upright member 58 is seen, as is the depending parallel sidewalls 66, (and 68) which are spaced apart by appropriate cross-dimensioning of these members so to snugly straddle the narrower cross-dimension 76 (FIG. 4P) of underlying member 60.

The end view of FIG. 4E depicts three of the four fingers/sidewalls (62L, 66, and 68), that interlock tubular members 58 and 60.The wider cross-section 78 of member 58 is 1.78", being such that the depending sidewalls, like 66 and 68, slidingly engage the narrower surface 76 of horizontal tubular member 60.

In the perspective view of FIG. 5, is depicted another prior art tubing end joinder of two rectangular tubular members, 80 and 82, providing for only a single L-shaped, right angle bracket 84, aligned inwardly. This provides but a single point interconnection with structural strength only, against outward divergence of the two members in their vertical plane.

In the perspective view of FIG. 6P, a three surface interconnection is provided by a modified upright member 86 of the present invention. Inwardly projecting finger 88 (formed from flaring one longitudinal wall of member 86), provides an inner L-bracket connection with member 90 (fastener 95), while parallel depending sidewalls, 92F and 92B, straddle upper surface 94 of underlying horizontal member 90. The unflared sidewalls 92F/B are traversed by fasteners 96F and 96B (FIG. 6E). This configuration provides a three surface connection of members providing inherent strength against torsional forces in three directions.

The side elevation of FIG. 6S, shows the three point connection, profiling the split out, horizontal flanged finger 88. The wider dimension (86W FIG. 6P) of upright member 86 snugly straddles the narrower dimension (not seen) of horizontal member 90. The end elevational view of FIG. 6E also depicts the three surface end mating of the members. The elongate linear groovings, like 96L and 96R, are depicted which facilitate the creation of end split off, like flanges 88 (FIG. 6S), resting on the upper surface of member 90.

In the perspective view of FIG. 7, is depicted a prior art, intermediate point conjoinder of a tubular vertical member 100 and a horizontal member 102, along with their is two brackets, 104U and 104L, which provide bilateral strength in the plane of the two members only.

In FIGS. 8P, 8E, 8S and 9 are shown squared tubular members 106 and 114 attached at 90° angles to each other, to provide four directional strength. The preferred procedure to make this joint is to bend out 108U and 108L, then bend out 110L, then fasten 108U, 108L, and the unflared side, then use tool to bend 110L back to straddle.

In the perspective view of FIG. 8P, the longitudinal end of horizontal member 106 has been flared doubly to provide upwardly and depending fingers, 108U and 108L, and a stepped out, finger 110L, drawn from sidewall 112 of member 106. The opposing vertical sidewall (not seen) is unflared and not stepped-out, can still straddle the cross-dimension 114N of upright member 114. The unilateral stepped-out finger 110L is achieved by bending same inwardly (from the intermediate position of FIG. 9) into parallel alignment of the sidewall 114W of member 114, after the other three fingers straddle upright member 114. This provides a four surface tubular interconnection with structural strength in four directions. Note the elongate linear groovings (116L/R and 119L/R) on the external surfaces of both members. In the side elevational view of FIG. 8S, the expanded width of finger 110L is depicted as embracing the dimension (114N of FIG. 8P) of upright member 114. In the end view of FIG. 8E, the four of the surface fasteners of this embodiment (118U/L/F/B) are shown.

In FIG. 9 is depicted the pre-final fabricating step in the flaring of horizontal member 106. The vertically flared fingers (108U/108L) and the unflared sidewall finger (not shown) are fastened to the vertical members 114. Prior to anchoring, the right side sidewall finger 110L is oriented outwardly (via tool levering) and is now positioned for manual bending about the upright member 114 to overlap same, so to give the four surface interconnection of FIG. 8E.

In the view of FIGS. 10B and 10P, are depicted the alterations wrought upon one longitudinal end of a rectangular tubular member 120, before and after cold working, where the prior art member lacks the longitudinal pre-grooving features (e.g., 116L/R in FIG. 8P) of the present invention. By mechanical leveraging with the tool of FIG. 21, an effort was made to provide a discrete, outwardly flared finger 122. The result was the poorly separated, sidewalls distorted, and ragged edged partitions 124L/R of FIG. 10P. Also, an internal protrusion 121, bulging inwardly at external bulge 123 is caused by the mechanical leveraging tool of FIG. 21. The member is unusable for planar interconnection.

In the side elevation view of FIG. 11S, a four surface interconnection has been provided for vertical member 124 (tubing of this invention), and inclined member 126 (a round tube not of this invention). Vertical member 124 has two opposing sidewalls (not seen) flared outwardly, i.e., finger 126L at an acute angle, and finger 126U at an obtuse angle, so to make dual contact on the surface of inclined member 126. The vertical sidewalls (124F and 124B, FIG. 11E) of member 124 are cut transversely to conform their edges (128F/B) to the changing angle of gable end bow (compare FIG. 2). This configuration provides for four fastener surfaces, and thus yields four directions of structural stability. The top view of FIG. 11T depicts the contacting surfaces and associated securing fasteners. In the end view of FIG. 11E, the unflared sidewall (128F) is fastened to other gable end bow of member 126. The opposing sidewall 128B is flared outwardly to overlap the opposing linear surface of the bow member 126.

The perspective view of FIG. 12P depicts an angular structural member 132 connected to a tubular structural member 136. Member 132 (pre-flaring) is shown in the end view of FIG. 20, as two-sided channel 182. A single, split out flanged finger 130U and adjacent sidewall extension 130F, of inclined member 132, provide a two surface connection for fasteners 134U/F. Here one side of inclined member 132 connects with the wider cross dimension 136W of horizontal member 136, while the second side 132F of member 132 connects to the narrower cross dimension 136N of horizontal member 136. This is better depicted in the end view of FIG. 12E.

In the perspective view of FIG. 13P, the lower member 142 has been rotated 90°. The inclined channel member 140 is fabricated with a single flared finger 140U (obtuse angle), so that depending sidewall ends 140F and 140B straddle the narrow dimension 142N of horizontal member 142. The three surface connection of members (secured with fasteners 144U, 144F, and 144B) is better seen in the end view of FIG. 13E. The elongate linear groovings of member 140, like 146L, and 146R, are quite proximal to the linear seams of tubing 142 and channel 140, and are depicted in both FIGS. 13P and 13E. The side elevation view of FIG. 13S is also common to the embodiments of both FIG. 12P and FIG. 13P, as the front side conjoinder shows a two surface connection, from this perspective.

In the related views of FIGS. 14R and 14S are seen both rectangular and squared cross-sectional tubular members, each with a plurality of longitudinal weakening groovings. In FIG. 14R, the inner corner seams 150A, 150B, 150C, and 150D, are each provided with a linear groovings, 152A–D, for the length of the elongate member, providing an inner set of length. These incisions constitute useful weakening groovings that permit a clean separation and finger flaring out of each, or all, of the end walls, as may be required for a particular assembly. Companion squared member 145 is similarly scored, both internally (151A–D) and externally (158A–H) of its elongate seams.

In the paired embodiments of FIGS. 15R and 15S, the groovings configuration is altered. No inside seam groovings are incorporated, while only the external seams each have a single initially V-shaped grooving 160A, 160B, 160C, and 160D. These also will facilitate clean separation and flaring out of each, or all, of the longitudinal end sidewalls. Similarly so with squared cross-section of FIG. 15S (161A–D).

In the paired embodiments of FIGS. 16R and 16S, only an external pair of groovings 162A/B, 162C/D, 162 E/F, and 162G/H are included at each elongate seam. They are in a like configuration to that of the external groovings of FIG. 14R, and will still provide for selected weakening lines upon tube end flaring. The squared cross sectional member of FIG. 16S are similarly scored (164A–D) on the external seams.

In the final cross sectional paired views of FIGS. 17R and 17S, only the internal elongate seams are provided with linear grooves, 164A, 164B, 164C, and 164D, for the elongate member length. These will provide the weakening lines for end flaring of any or all of the four sidewalls, 166A–D. The squared member of FIG. 17S is similarly scored (167A–D)on the internal seams.

In the cross sectional view of FIG. 18, the rectangular member of FIG. 14R has been modified in the process of extrusion (168) to present, on one surface, two laterally projecting ledges, dissimilarly configured. These elongate, seam-integral ledges (170U and 170L) present an externally located and recessed channel 172, adapted to receive flexible sheeting (not seen), when the member 168 is positioned, in either the vertical or horizontal position, in the end wall of a greenhouse, like that of FIG. 2, and when vertical sheeting is to be draped and secured over the gabled end of the structure. A flexible wire spring device (not seen), such as I have disclosed in my earlier files, now U.S. Pat. No. 5,671,795 granted Sep. 30, 1997, can be used here to retain a draped over sheeting firmly within channel 172 of the horizontal-post-like member 168 of FIG. 18. The flexible sheeting clasping ability, enabled by the protecting flanges 170U and 170L and channel 172 is not part of this invention, but is representative of how an ability to clasp flexible fabric to these structural members can be molded into the shape of the structural member when creating these shapes from extrudable materials. Similarly, with extruded members, the ability to mold other external sides of the tube can be utilized as an added benefit to the extruded shape while still allowing the flaring of ends of the tubes and the resulting conjoining of tubes, such as further described in FIGS. 26.

In the FIG. 19 cross sectional view, a three sided channel member 174 is depicted, having a generally squared cross section, and being provided with a pair of offset groovings, 176A/B and 176C/D, located about the external elongate seams; and a single longitudinal grooving 178A and C, located at both internal corners, 180A and 180C. The sectional view of FIG. 20 depicts a L-shaped, elongate member 182 having a set of both external and internal groovings, 184A/B and 186 like the ones depicted in FIGS. 14S and 19. The use of members 174 and 182 in FIGS. 19 and 20 are shown in connections depicted in FIGS. 13P and 12P, respectively.

The schematic views of FIGS. 21T and 21S present one embodiment of an isolated flaring tool, useful with the structural member interconnections (as in FIG. 2) of this invention. The preferred embodiment of a flaring/bending tool 191 shown in FIGS. 21S/21T, side and top views, respectively, has a narrow tool-head 194N and an opposing end wide tool-head 194W welded to each end of the tool handle 192. The tube bending slots 196N and 196W in the narrow tool-head 194N and the wide tool-head 194W, respectively, are slightly wider than the thickness of the tubing walls 200N/W, and 201N/W. The width of the narrow tool-head 194N is slightly narrower than the narrower internal sidewall 200N of the tubing 198, and the width of the wider tool-head 194W is slightly narrower than the wider internal sidewall 200W of the tube 198.

When the narrow tool-head 194N is inserted between the wider sides of tube 198 and the slot 196N is projected down over the end of the narrow tubing sidewall 200N, as in FIG. 22A, the tool is in a position to begin bending out the end of the sidewall 200N, of FIG. 21T. As the tool handle 192 is pulled and rotated in the direction of the arrows shown in FIG. 22B, the narrow sidewall 200N in FIG. 21T is bent or flared outwards and downwards to create the flare 200 in FIG. 22B. The upper and lower flaring grooves 199U/L in FIG. 21T would allow a controlled break-away of the end of sidewall 200N from the opposing two sidewalls 200W and 201W. This step can be continued on one or more of the other end sidewalls of the structural members as the conjoining of the tubular, channel and angular, members of this invention may be required.

In the related end views of FIGS. 23A–D, are seen a complemental set of four rectangular cross-section tubular members, configured to have complementally sized cross-sections, such that they permit the snug lodging of the larger side dimension of one member within the shorter side-dimension of the next larger dimensioned tubular member; for example, the higher dimension 206 of tubular member 202A will lodge snugly within the narrower vertical dimension 208 of tubular member 202B.

Similarly, so with tube "B", the wider dimension 210 of tubular member 202B will lodge snugly within the shorter width between the inner sidewalls 212 of tube member 202C, while the "C" tube 202C has higher outer dimension 214 which will snugly fit into the inner vertical dimension 216 of "D" tube 202D. These examples of complemental tubular cross-section dimensions provide for a variety of abutting ends pairing of rectangular tubings having close tolerances and adapted for pressure-fitted end engagements.

In the two longitudinal end views of FIG. 24A/B, in addition to the depicted inner and outer corners sets of paired groovings, first shown in FIGS. 14R/S, there are now provided, transversely and midway of each of the four planar external surfaces 220N/S/E/W of tubing 220, a longitudinal linear grooving located at 221N/S/E/W for the purpose of assisting the installation of self-drilling fasteners 64L as seen in FIG. 4P, to be started within the drill-guide grooves 221N/S/E/W. In the machine extruded tubular embodiment of FIG. 24A, there are also provided elongated, paired outer grooves 222A/D 223A/B, 222B/C, and 223C/D, and elongate, rounded inner grooves, 224A/B/C/D. Inner grooves 224A/B work together with opposing outer grooves 223A/B, to provide controlled sidewall separation lines to enable flaring outward of side 220E. Inner grooves 224B/C work together with opposing outer grooves 222B/C to allow controlled flare-out of sidewall 220S, etc.

In FIG. 24B, the outer grooves 222A/D, 223A/B, 222B/C, and 223C/D are deeper than the comparable outer grooves in FIG. 24A, and do not require the inner corner grooves, such as 224A/B/C/D as in FIG. 24A, in order to effect controlled sidewall separation lines for flareout of the respective sides as illustrated in FIG. 25.

The perspective views of FIG. 25 depict how longitudinal ends of tubular members, 228, 230, 232 and 234, of the present invention can be adapted to be mounted upon the linear edge of a subsisting solid object 220, like a concrete slab. On tubular member 228, as the four fingers are produced using the tool of FIG. 21S, one finger (not shown) is eliminated by flexing the flared tab several times, until it breaks off at the bending line 228E. One finger 228F depends externally to be fastened to the slab sidewall 220S, and two fingers 228L/B are flared outwardly, to be fastened to the horizontal plane 220F of slab 220. On tubular member 230, there are one depending finger 230F, and three flared fingers, 230L, 230R, and 230B.

Corner position tubular member 232C has two depending end segments, 232F and 232R, and two flared fingers 232L and 232B, all being slab fastened. Inclined member 234 (like that of FIG. 12P), is fastened to slab 220S having one depending sidewall finger 234R and three flared fingers, 234L/F/B. This composite Figure depicts many of the useful end tube flarings that can be obtained by modifying the squared tubular ends of the tubular members of this invention.

In the views of FIGS. 26P, 26T, 26S, and 26E, an end-conjoining of two identically configured tubular members, 240 and 242 (like that shown in FIGS. 6P, 6E, and 6S), are depicted with one major variation. Each of the conjoined members are provided with an integral elongate external recess, 240R and 242R, respectively. These elongate recesses are effected by modification of the extrusion die profile, well within the skill of the metal fabricating arts, to provide assembled tubular members, 240/242, as appearing in end FIG. 26E. While the U-shaped recesses, 240R/242R, are depicted as being integral with the shorter dimension 240N of the horizontal tubing 240 of FIG. 27E, they can as readily be provided for the longer vertical dimension 240W of tube 240. The side elevation, end elevation, and perspective views of FIGS. 26S/E/P show the end-conjoined pair of tubes, 240/242, using two sidewall fingers 244R and 244L, and one horizontal flared finger 244T. The end and top plan views of FIG. 26E/T depicts how the three fasteners, 246A/B/C, affix the tubes to one another with stability.

The retainer clips 248/250 in FIGS. 27E/26T snap resiliently into the channels 240R/242R of the modified tubular members. Clips 248/250 are a simple resilient V-shaped member of spring steel or plastic, which are shown engaged with flexible sheeting tucked into the channels, 240R/242R and anchored therein, when clips 248/250 are pressed between opposing inner lugs 252U/L, which lugs are integral to the channel members themselves. This U-shaped clip and U-shaped channel is prior art and this configuration represents how features can be moulded into the sides of extruded tubes of this invention and still allow the tube sides at the ends to be flared out and utilized to construct various connections.

In the elevational view of FIG. 28, there is depicted how three tubular members, 264/266/268, of this invention are conjoined at right angles to one another so as to provide a skeletal supporting framework, generally 260, for an overlying planar bench surface 262. Vertical member 264 admits internally of the end view cross section of final, horizontal tubular member 266, having flared end 267, and two unflared sides, 264L/R. The other horizontal member 268 has a depending, right angle flared end segment 270, a projecting, right angle flared finger 273, aligned with the side of horizontal tube member 266, and also a straightly aligned end segment 272, overlapping horizontal member 266. These modified end segments serve to conjoin the three members via the use of tubing sidewall fasteners 274A,B,C and D, while the larger depending wood screw 276, anchors the bench top 262 to the underlying tubular member framework 260.

The composite views of FIGS. 29A–F show end modification of six tubular members, 290, 292, 294, 296, 298, and 300, which have been prepared to mount to any flat surface, such as a wall, floor or ceiling. The views of FIGS. 29A/B show modification of two tubular members 290, 292, to present flared outward segments 290A/B/C/D in FIG. 29A, and like flared outer segments 292A/B/C in FIG. 29B. The sole difference is the comparable reverse flared segment 290D, depicted in FIG. 29A, but not appearing in FIG. 29B, because the equivalent fared member has been flexed with a flaring tool, as shown in FIG. 21T, until it has been broken off through metal fatigue at its bending line (not shown).

Figure 29F:
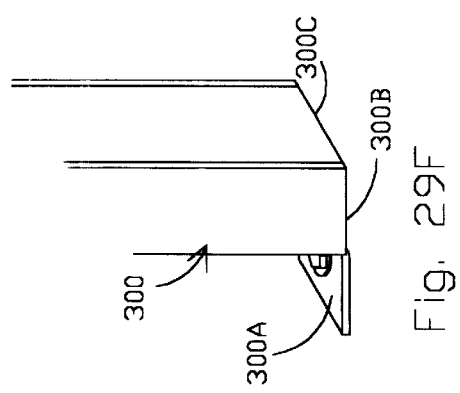
Figure 29E:
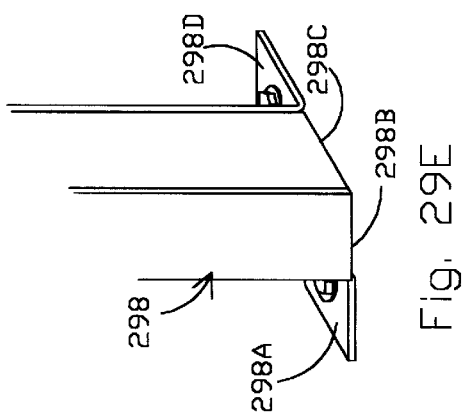
Figure 29B:
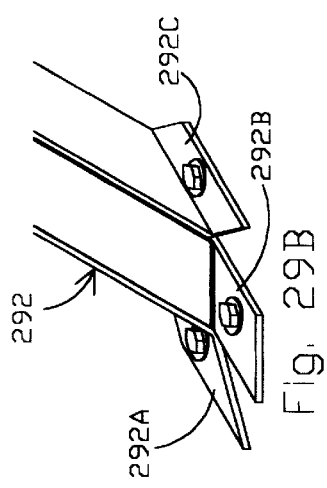
Figure 29D:
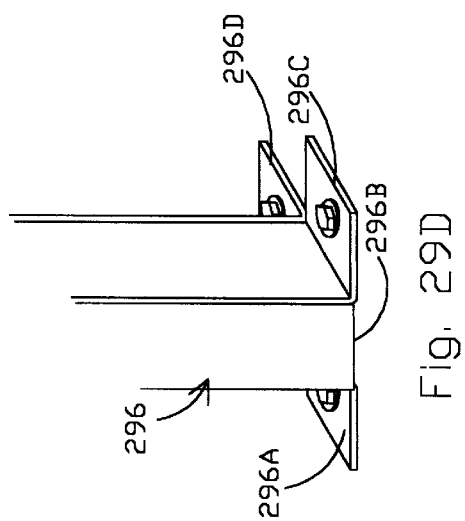
Figure 29A:
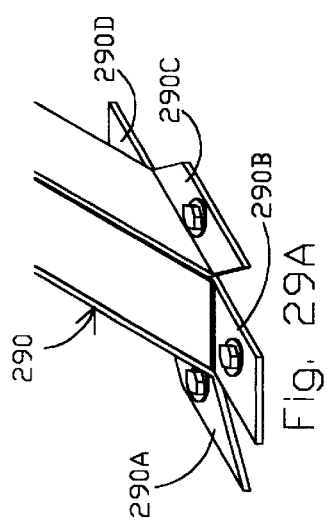
Figure 29C:
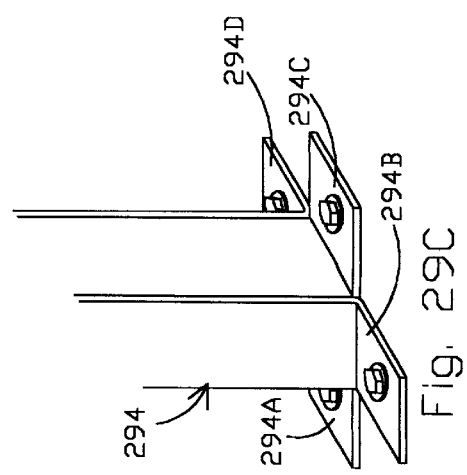

In FIG. 29C, the ends of the four sides of tube member 294 have been flared outward at 90° angles to create four flared fingers, 294A/B/C/D. Likewise in FIG. 29D, tube member 296 has three 90° flared fingers, 296A/C/D, but the comparable finger 294B in FIG. 29C is missing in FIG. 29D, because the finger (not shown) has been broken away along line 296B with a flaring tool like shown in FIG. 21T. Similarly, in FIGS. 29E/F are seen comparable linear edges, 298B/C and 300B/C of the tube members 298/300, where fingers (not shown) have been flexed with the tool in FIG. 21T, and broken away after metal fatigue occurred.

The sequence of tube forming steps for working with stock sheet steel (an alternate metal to aluminum extrusions and suitable for these purposes) are depicted in FIGS. 30A to 30G. The stock sheet 310 of FIG. 30A is conventionally converted to the longitudinally and parallelly multi-grooved planar member 312 in FIG. 30B, using a rotatable multiblade lathe 314 or hardened wheels in FIG. 30C. The resulting multi-grooved member, 316, is first folded, as seen in FIG. 30D, along the outermost pair of grooves, 317A/B, and drawn to opposing right angles, 315A/B, as are depicted in FIG. 30E. Then, the inward convergence of the sidewalls, 318A/B, is next forced along the inner set of longitudinal groovings, 319A/B, as depicted in FIG. 30F. Finally, in FIG. 30G, the three sidewalls, 318A/B/C, are converged to form a rectangular cross section for a resulting tubular member 320. Conventional welding along the longitudinal seam 322 provides a sheet steel tubular member having structural integrity for conjoining with other such tubular members, of like materials of construction. Internal longitudinal flaring weakening grooves, 317A/B and 319A/B, provide for controlled flaring at the ends of the tubes such as shown in FIGS. 29A–29F. Sheet gauges range from 44 (very thin) to zero (relatively thick). Sheets ranging from gauges 16 to 3 are best processed with the bending tools described herein.

Another alternate sequence of the tube forming steps for working with sheet steel that results in providing external longitudinal flaring weakening grooves, such as shown in FIGS. 15R/S, is illustrated in FIGS. 31A–31F.

Figure 31A:
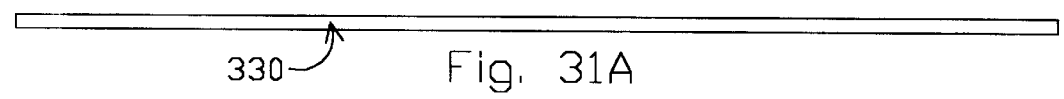
Figure 31B:
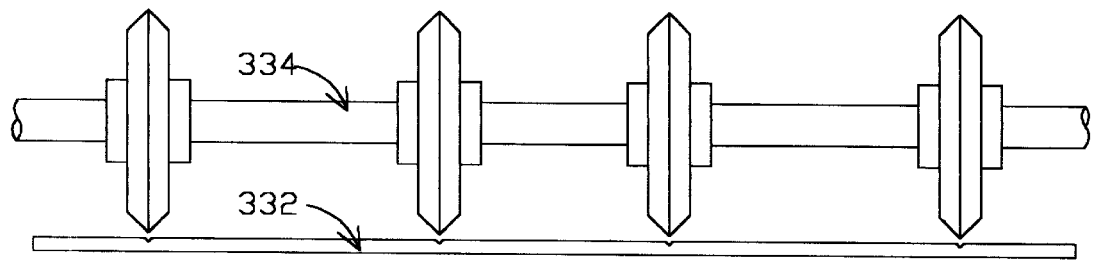
Figure 31C:
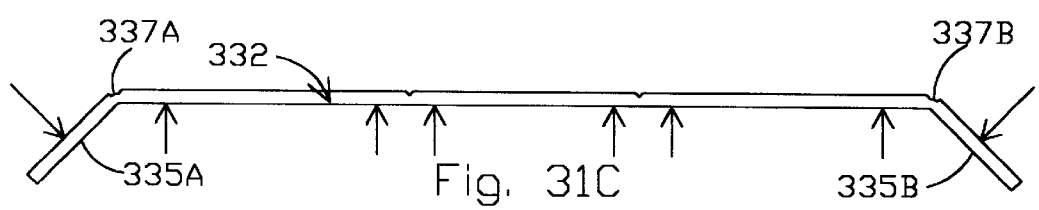
Figure 31D:
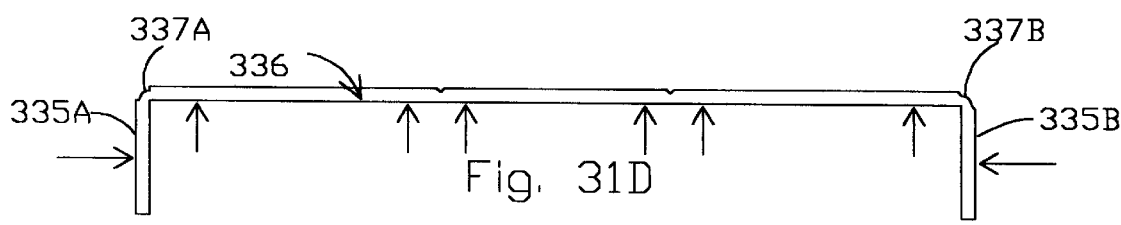
Figure 31E:
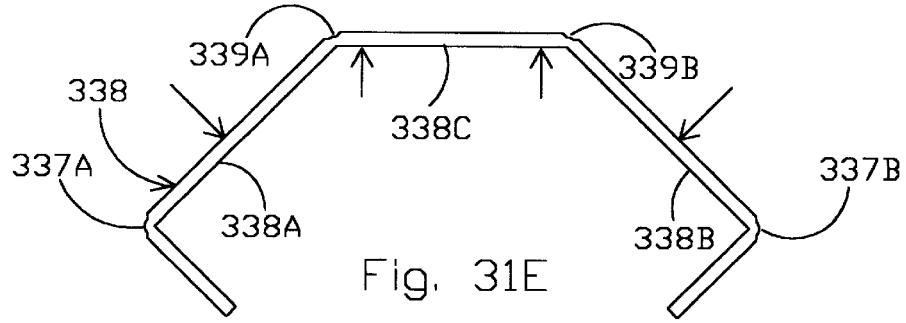
Figure 31F:
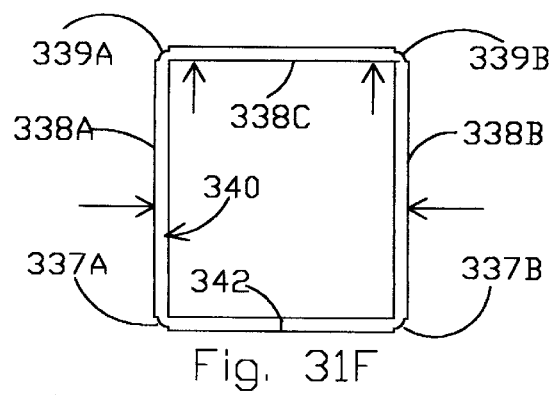

The stock sheet 330 of FIG. 31A is conventionally converted to the longitudinal and parallel multi-grooved planar member 332 in FIG. 31B using a rotatable multiblade lathe or hardened wheels 334. The resulting multi-grooved member 332 is first folded, as seen in FIG. 31C, along the outermost pair of grooves, 337A/B, and drawn to opposing right angles, 335A/B, as are depicted in FIG. 31D. Then the inward convergence of the sidewalls, 338A/B, is next forced along the inner set of longitudinal groovings, 339A/B, as depicted in FIG. 31, FIG. 31E. Finally, in FIG. 31F, the three sidewalls 338A/B/C, are converged to form a rectangular cross section for a resulting tubular member 340. Conventional welding along the longitudinal seam 342 provides a sheet steel tubular member having structural integrity for conjoining with other such tubular members of like materials of construction, with external weakening grooves 337A/B/C/D, located proximal to each corner for controlled flaring as illustrated in FIG. 25 and FIGS. 29A–F.

In Operation

Often, the side of the tube opposing the side that was just flared outwards will also need to be flared outwards. This will result in a dual-finger configuration for an interconnection between two lengths of tube of the same cross-section. Because the inside dimensions of the wider longitudinal sides of the tube are equal to, or slightly exceed, the external dimension of the same tube size, the two unflared sidewalls of the first tube will slidingly engage the narrower sidewall of another length of the same sized tube. The two flared-outwards sides of the first tube will be brought into planar contact with one of the narrower sides of the second tube.

After perforation, one or more fasteners can now be placed through each of the two (or more) flanges formed by flaring outwards the ends of the wider sides of the first tube and through the one narrower side of the second tube if using a self-threading fastener (or by bolting through both narrow sides of the second tube). Also, one or more fasteners can now be placed through the two narrower width sides of the first tube that were not flared outwards, through the wider sides of the sidewalls of the second tube which the first tube straddles.

When interconnections provide right angled junctures at two longitudinal ends of two tubes, one wider sidewall of the first tube can be flared outwards, while leaving the opposing second wider sidewall unflared. The narrower width sides of the first tube can be slipped over the one end of the second tube, straddling one of the narrower sides of the second tube, for a three point connection.

Preferably, by the use of self-drilling fasteners they can be used to create the interconnection in one simple step of drilling and fastening at one time. Installers, who do not have ready access to such fasteners, can drill holes through the flanges and utilize standard bolts and nuts for securing the conjoined tubular members.

What is claimed is:

1. A rigid tubular member of a variable length formed from extrudable aluminum stock in which the member sidewalls are generally planar throughout their length and adapted to be custom-fitted and conjoined with at least one rigid surface of another member, the tubular member being provided with linear groovings along at least one planar surface to permit controlled separation of at least one sidewall thereof along the groovings, such tubular member comprising:

(a) a transverse configuration which is rectangular in cross-section and has open longitudinal ends; and (b) a first pair of externally-placed, linear groovings arrayed in parallel with each of the groovings being located proximal to each of the two seams of a single member sidewall in one planar surface of the member, and each of the groovings being of a depth sufficient to facilitate separation under force of at least an initial finger from one end wall segment from the adjacent two end wall segments, while maintaining the structural integrity of the transverse dimension of the separated end wall segment at the end point of separation.

2. The tubular member of claim 1 wherein a second pair of externally-placed, linear groovings, arrayed in parallel, are located in an opposing planar surface of the member, with each of the groovings being located proximal to one of the elongate seams in the opposing planar surface, and each of the second pair of groovings being of a depth sufficient to facilitate separation under force of at least an initial second finger from a second end wall segment from the adjoining two end wall segments, while maintaining the structural integrity of the transverse dimension of the separated end wall segment at the end point of separation.

3. The tubular member of claim 2 wherein a third pair of externally-placed, linear groovings, arrayed in parallel, are located in at least one of the third and fourth planar surfaces of the member, having the same juxtaposition as did each of the first and second pairs, and being of substantially the same depths as the first and second pairs of groovings to facilitate separation under force of at least an initial third finger from a third end wall segment from the adjacent two end wall segments.

4. A rigid tubular member of a variable length formed from extrudable aluminum stock, in which the member sidewalls are generally planar throughout their length and adapted to be custom-fitted and conjoined with at least one planar surface of another member, the tubular member being provided with linear groovings along at least one planar surface to permit controlled separation of at least one sidewall thereof along the groovings, such tubular member comprising:

(a) a transverse configuration which is rectangular in cross-section and has open longitudinal ends; and (b) a first pair of externally-placed linear groovings, arrayed in parallel, with each such grooving located coincident with the two external linear seams of the tubing located on the elongate edges of one planar surface thereof, and with each of such groovings being of a depth sufficient to facilitate separation under force of at least an initial first finger from a first end wall segment from the adjacent end wall segments.

5. The tubular member of claim 4 wherein a second pair of externally-placed, linear groovings, arrayed in parallel, are located in an opposing planar surface of the member, with each of the groovings being located coincident with the external linear seams of the tubing and on the opposing elongate edges of one planar surface thereof, and with each of the second pair being of a depth sufficient to facilitate separation under force of at least an initial second finger from a second end wall segment from the adjoining two end wall segments, while maintaining the structural integrity of the transverse dimension of the separated end wall segment at the end point of separation.

6. A rigid tubular member of a variable length formed from extrudable aluminum stock in which the member sidewalls are generally planar throughout their length adapted to be custom-fitted and conjoined with at least one rigid surface of another rigid member, the tubular member being provided with linear groovings along at least one planar surface to permit controlled separation of at least one sidewall thereof along the groovings, such tubular member comprising:

(a) a transverse configuration which is rectangular in cross-section and has open longitudinal ends; and (b) a first pair of internally-placed, linear groovings, arrayed in parallel, with each of the groovings being located coincident with the two internal linear seams of one planar surface of a tubing sidewall, thereof, with each of the groovings being of a depth sufficient to facilitate separation under force of at least an initial first finger from one end wall segment from the adjacent two end wall segments, while maintaining the structural integrity of the transverse dimension of the separated end wall at the points of separation.

7. The tubular member of claim 6 wherein a second pair of internally placed, linear groovings, arrayed in parallel, are located in the opposing planar surface of the member, with each of the groovings being located coincident with the two elongate seams in the opposing planar surface, and each of the second pair being of a sufficient depth sufficient to facilitate separation under force of at least an initial second finger from one end wall segment from the adjacent two end wall segments, while maintaining the structural integrity of the transverse dimension of the separated end wall at the points of separation.

8. A rigid tubular member of a variable length formed from extrudable aluminum stock in which the member sidewalls are generally planar throughout their length adapted to be custom-fitted and conjoined with at least one rigid surface of another member, the tubular member being provided with linear groovings along at least one planar surface to permit controlled separation of at least one sidewall along the groovings, adapted to be fitted to other surfaces, such tubular member comprising:

(a) a transverse configuration which is rectangular in cross-section and has open longitudinal ends;

(b) a first pair of externally-placed, linear groovings, arrayed in parallel, with each of the groovings being located proximal to each of the two seams of a single member sidewall in one planar surface of the member; and, (c) a first pair of internally-placed, linear groovings, arrayed in parallel, with each of the groovings being located coincident with the internal linear seams of a first planar surface tubing sidewall, of the opposite side of the first planar surface thereof, with the combination of the internal and external groovings being of a depth sufficient to facilitate separation under force of at least an initial first finger from one end wall segment from the adjacent two end wall segments, while maintaining the structural integrity of the transverse dimension of the separated end wall at the points of separation.

9. The tubular member of claim 8 wherein:

(a) a second pair of externally-placed, linear groovings, arrayed in parallel, are located in the opposing planar surface of the member, with each of the groovings being located proximal to one of the elongate seams in an opposing planar surface; and, (b) a second pair of internally placed, linear groovings, arrayed in parallel, are located in the opposing planar surface of the member, and disposed on the opposing elongate edge of the opposing planar surface, with each of the groovings being located coincident with one of the elongate seams in the opposing planar surface, and with the combination of the internal and external groovings being of a sufficient depth sufficient to facilitate separation under force of at least an initial first finger from one end wall segment from the adjacent two end wall segments, while maintaining the structural integrity of the transverse dimension of the separated end wall at the points of separation.

10. The tubular member of claim 1 having a rectangular cross-section, wherein the internal span of the one opposing pair of sidewalls have depending end segments which are adapted to tightly engage the external span of a complemental pair of sidewalls on a second tubular member of identical cross dimensions.

11. A pair of conjoined tubular members of variable length and like rectangular cross-sections formed from extrudable aluminum stock, each having a narrower internal dimensional span and a comparatively wider external dimensional span wherein:

(a) the internal span of one opposing pair of sidewalls of a first member which is left intact, while at least one of the complemental end sidewalls of a second member and as to the one end sidewall it includes a first pair of externally-placed, linear groovings arrayed in parallel with each of the groovings being located proximal to one of the elongate opposing seams in one planar surface of the member, and each of the groovings being of a depth sufficient to facilitate separation under force of at least an initial finger from one end wall segment from the adjacent two end wall segments, while maintaining the structural integrity of the transverse dimension of the separated end wall segment at the end point of separation which has been flared outwardly and fixedly and so that:

(b) the internal dimensional span of the first pair of sidewalls of the second member snugly straddles the narrower external dimensional span of the other intact first member for purposes of member conjoining at a point along the longitudinal dimensions of the first tubular member.

12. The conjoined tubular pair of claim 11 wherein the straddling second member is mounted upon the other first member at a substantially right angle.

13. The conjoined tubular pair of claim 11 wherein the straddling second member is mounted upon the other first member at an acute angle.

14. The conjoined tubular pair of claim 11 wherein each of two or more flared fingers of the divergent sidewall end segments are provided with a substantially central perforation, which perforations are adapted to align themselves with a complemental set of perforations provided in the sidewalls of the other conjoined member, so as to permit the passage therethrough of two or more interconnecting and fastener members.

15. A pair of conjoined tubular members of variable length and rectangular cross-section both formed from extrudable aluminum stock having a narrower external dimensional span and a comparatively wider internal dimensional span, wherein the external dimensional span of the opposing pair of sidewalls of the first member is left intact, while at least one of the end sidewalls of the second member includes:

(a) a first pair of externally-placed, linear groovings arrayed in parallel with each of the groovings being located proximal to each of the two seams of a single member sidewall in one planar surface of the member, and each of the groovings being of a depth sufficient to facilitate separation under force of at least an initial finger from one end wall segment from the adjacent two end wall segments, while maintaining the structural integrity of the transverse dimension of the separated end wall segment at the end point of separation and which has been flared outwardly and fixedly, so that:

(b) the internal dimensional span of the second member tightly straddles the unflared end sidewalls of the external narrower dimension of the first member at its one longitudinal end, providing at least three sidewall end segments of the second member contacting the first member.

16. A pair of conjoined tubular members each of variable length and rectangular cross-section formed from extrudable aluminum stock, each having a narrower external dimensional span and, on the opposing sides, a comparatively wider, internal dimensional span of the remaining two sides, wherein:

(a) first pair of externally-placed linear groovings arrayed in parallel with each of the groovings being located proximal to one of the elongate opposing seams in one planar surface of the second member, and each of the groovings being of a depth sufficient to facilitate separation under force of at least an initial finger from one end wall segment from the adjacent two end wall segments, while maintaining the structural integrity of the transverse dimension of the separated end wall segment at the end point of separation;

(b) a second pair of externally-placed linear groovings, arrayed in parallel, are located in an opposing planar surface of the second member, with each of the groovings being located proximal to one of the elongate seams in the opposing planar surface, and each of the second pair of groovings being of a depth sufficient to facilitate separation under force of at least an initial second finger from a second end wall segment from the adjoining two end wall segments, while maintaining the structural integrity of the transverse dimension of the separated end wall segment at the end point of separation;

(c) one opposing pair of sidewall end segments of the second member are flared angularly relative to the intact first member sidewall and seat upon an external planar surface of the first member sidewall;

(d) while at least one of the other end segments of the second member has been flared outwardly and fixedly so that:

(e) the opposing pair of sidewall end segments of the second member are stepped out and adapted to straddle the external dimensional span of the first intact tubular member.

17. The pair of tubular members of claim 16 wherein the first member sidewall end segments and the intact second member sidewalls are each provided with a substantially central perforation, which perforations are adapted to align themselves with a complemental set of perforations in the underlying intact second member, so as to permit the passage therethrough of two or more interconnecting and fastening members.

18. A tubular member and a right angle member conjoined and each being of variable length and rectangular cross-section formed from extrudable aluminum stock, wherein at least one of the sidewall end segments of the angle member is flared angularly relative to one intact tubular member sidewall and seats upon the external planar surface of the intact tubular member sidewall, wherein as to the angle member a first pair of externally placed, linear groovings are located proximal to a single seam with each of the groovings being of a depth sufficient to facilitate separation under force of an initial finger from one of the end walls.

19. The rigid tubular member of claim 1 wherein the material of construction is sheeted steel of a gauge forming said structural tubing.

20. The rigid tubular member of claim 1 wherein the material of construction is a thermosetting plastic resin extruded to a formed member retaining its structural integrity under bearing load.

21. A pair of conjoined tubular members each of variable length and rectangular cross-section both formed from extrudable aluminum stock, wherein:

(a) a first pair of externally-placed, linear groovings arrayed in parallel with each of the groovings being located proximal to each of the two seams of a single member sidewall in one planar surface of the second member, and each of the groovings being of a depth sufficient to facilitate separation under force of at least an initial finger from one end wall segment from the adjacent two end wall segments, while maintaining the structural integrity of the transverse dimension of the separated end wall segment at the end point of separation;

(b) a second pair of externally-placed, linear groovings, arrayed in parallel, are located in an opposing planar surface of the second member, with each of the groovings being located proximal to one of the elongate seams in the opposing planar surface, and each of the second pair of groovings being of a depth sufficient to facilitate separation under force of at least an initial second finger from a second end wall segment from the adjoining two end wall segments, while maintaining the structural integrity of the transverse dimension of the separated end wall segment at the end point of separation;

(c) one opposing pair of the sidewall end segments of the second member are flared angularly relative to the intact first member sidewall and seat upon an external planar surface of the first member sidewall;

(d) while at least one of the other end segments of the second member has been flared outwardly and fixedly, so that:

(e) the opposing pair of sidewall end members of the second member are adapted to straddle the external dimensional span of the first intact tubular member.

* * * * *